(12) United States Patent
Li et al.

(10) Patent No.: US 11,831,708 B2
(45) Date of Patent: Nov. 28, 2023

(54) DISTRIBUTED COMPUTATION OFFLOADING METHOD BASED ON COMPUTATION-NETWORK COLLABORATION IN STOCHASTIC NETWORK

(71) Applicant: CHONGQING UNIVERSITY OF POSTS AND TELECOMMUNICATIONS, Chongqing (CN)

(72) Inventors: Yun Li, Chongqing (CN); Shichao Xia, Chongqing (CN); Zhixiu Yao, Chongqing (CN); Guangfu Wu, Chongqing (CN); Hongcheng Zhuang, Chongqing (CN); Zhaocheng Wang, Chongqing (CN)

(73) Assignee: CHONGQING UNIVERSITY OF POSTS AND TELECOMMUNICATIONS, Chongqing (CN)

( * ) Notice: Subject to any disclaimer, the term of this patent is extended or adjusted under 35 U.S.C. 154(b) by 0 days.

(21) Appl. No.: 18/015,145

(22) PCT Filed: Nov. 5, 2021

(86) PCT No.: PCT/CN2021/128920
§ 371 (c)(1),
(2) Date: Jan. 9, 2023

(87) PCT Pub. No.: WO2023/040022
PCT Pub. Date: Mar. 23, 2023

(65) Prior Publication Data
US 2023/0199061 A1    Jun. 22, 2023

(30) Foreign Application Priority Data
Sep. 17, 2021 (CN) ......................... 202111095551.7

(51) Int. Cl.
*H04L 67/1023* (2022.01)
*G06F 9/48* (2006.01)

(52) U.S. Cl.
CPC ........ *H04L 67/1023* (2013.01); *G06F 9/4881* (2013.01)

(58) Field of Classification Search
CPC .................................................... G06F 9/4881
See application file for complete search history.

(56) References Cited

U.S. PATENT DOCUMENTS 11,427,215 B2 * 8/2022 Wang ...................... H04W 4/40
2018/0183855 A1 * 6/2018 Sabella ............. H04W 52/0264
(Continued)

FOREIGN PATENT DOCUMENTS

| CN | 108809695 A | 11/2018 |
| CN | 110928654 A | 3/2020 |

(Continued)

OTHER PUBLICATIONS

International Search Report for PCT/CN2021/128920 dated Mar. 30, 2022, ISA/CN.
(Continued)

*Primary Examiner* — Viet D Vu
(74) *Attorney, Agent, or Firm* — Yue (Robert) Xu; Apex Attorneys at Law, LLP

(57) ABSTRACT

A distributed computation offloading method based on computation-network collaboration in a stochastic network is provided. The distributed computation offloading method includes: building a device revenue maximization problem model and a MEC server revenue maximization problem model based on a local computing model and an edge cloud computing model; building composite sets of scenarios for dwell time and waiting latency based on a random movement of a user and burst computation demands; compensat- (Continued)

ing for a game strategy by using a posteriori recourse action and building a game-based stochastic programming model between the device and the MEC server; transforming a multi-stage stochastic regularization problem for both the device and the MEC server into a DEP problem by constructing a scenario tree, and solving the DEP problem to obtain an optimal task strategy for the offloading from the MEC server and an optimal offering strategy of the MEC server to the device.

9 Claims, 7 Drawing Sheets

(56) References Cited

U.S. PATENT DOCUMENTS

| | | | |
|---|---|---|---|
| 2019/0020657 A1 | 1/2019 | Egner et al. | |
| 2021/0266834 A1* | 8/2021 | Hu | H04W 4/46 |
| 2022/0083391 A1* | 3/2022 | Liu | G06F 9/4881 |
| 2022/0360645 A1* | 11/2022 | Badic | H04L 67/51 |

FOREIGN PATENT DOCUMENTS

| | | |
|---|---|---|
| CN | 111163521 A | 5/2020 |
| CN | 111401744 A | 7/2020 |
| CN | 113114733 A | 7/2021 |
| CN | 113377447 A | 9/2021 |
| EP | 3457664 A1 | 3/2019 |

OTHER PUBLICATIONS

Ibtissam Labriji, et al. Mobility Aware and Dynamic Migration of MEC Services for the Internet of Vehicles, IEEE Transactions on Network and Service Management, vol. 18, No. 1, Mar. 2021.

Mian Guo, et al. Energy-Efficient and Delay-Guaranteed Workload Allocation in IoT-Edge-Cloud Computing Systems, Journal of IEEE Access.

* cited by examiner

```
┌─────────────────────────────────────────────────────────────────────────┐
│   Establish a local computing model and an edge-cloud computing model    │
│   based on differentiated service quality requirements, task processing  │
│          costs, and the type of a device in a UDN environment            │
└─────────────────────────────────────────────────────────────────────────┘
                                    │
┌─────────────────────────────────────────────────────────────────────────┐
│ Establish, based on the local computing model and the edge-cloud         │
│ computing model, a device revenue maximization problem model by using    │
│ a Lyapunov optimization theory and a minimum drift decreasing utility    │
│                        function at the device                            │
└─────────────────────────────────────────────────────────────────────────┘
                                    │
┌─────────────────────────────────────────────────────────────────────────┐
│ Establish, based on the local computing model and the edge cloud         │
│ computing model, a MEC server revenue maximization problem model by      │
│         using a maximum value theory at an MEC server                    │
└─────────────────────────────────────────────────────────────────────────┘
                                    │
┌─────────────────────────────────────────────────────────────────────────┐
│ Respectively establish, based on a random movement of a user and a       │
│ burst computation requirement, a composite scenario set based on a       │
│     dwell time period and a composite scenario set based on a            │
│                            waiting delay                                 │
└─────────────────────────────────────────────────────────────────────────┘
                                    │
┌─────────────────────────────────────────────────────────────────────────┐
│ Perform compensation on a game strategy by using a posteriori recourse   │
│ action, and establish a game-based stochastic programming model for      │
│                    the device and the MEC server                         │
└─────────────────────────────────────────────────────────────────────────┘
                                    │
┌─────────────────────────────────────────────────────────────────────────┐
│ Establish a scenario tree to transform a multi-stage stochastic          │
│    programming problem of the device and the MEC server to a DEP problem │
└─────────────────────────────────────────────────────────────────────────┘
                                    │
┌─────────────────────────────────────────────────────────────────────────┐
│ Solve an optimization problem of the device and an optimization problem  │
│ of the MEC server based on a Lagrangian multiplier and a KKT condition   │
│ to obtain an optimal task offloading strategy of the device to the MEC   │
│   server and an optimal quotation strategy of the MEC server to the      │
│                                device                                    │
└─────────────────────────────────────────────────────────────────────────┘
                                    │
┌─────────────────────────────────────────────────────────────────────────┐
│ In a case that each of the optimal task offloading strategy of the       │
│ device to the MEC server and the optimal quotation strategy of the MEC   │
│ server to the device meets a Stackelberg equilibrium solution, offload,  │
│ by the device based on the optimal task offloading strategy, a task      │
│                          to the MEC server                               │
└─────────────────────────────────────────────────────────────────────────┘
```

Figure 2

DISTRIBUTED COMPUTATION OFFLOADING METHOD BASED ON COMPUTATION-NETWORK COLLABORATION IN STOCHASTIC NETWORK

The present application is the national phase of International Patent Application No. PCT/CN2021/128920, titled "DISTRIBUTED COMPUTATION OFFLOADING METHOD BASED ON COMPUTATION-NETWORK COLLABORATION IN STOCHASTIC NETWORK", filed on Nov. 5, 2021, which claims priority to Chinese Patent Application No. 202111095551.7, titled "DISTRIBUTED COMPUTATION OFFLOADING METHOD BASED ON COMPUTATION-NETWORK COLLABORATION IN STOCHASTIC NETWORK", filed on Sep. 17, 2021 with the Chinese Patent Office, both of which are incorporated herein by reference in their entireties.

FIELD

The present disclosure relates to the technical field of mobile communications, and in particular to a distributed computation offloading method based on computation-network collaboration in a stochastic network.

BACKGROUND

With the rapid development and integration of mobile Internet and Internet of Things, mobile devices (MDs) (such as smartphones, wearable devices, and automatic driving vehicles) and cloud-oriented applications (such as virtual reality (VR), augmented reality (AR), and online games) are widely used, driving computing power and storage resources to the edge of the network to reduce transmission delays and congestions. With the multi-access edge computing (MEC) technology, part or all of computing tasks of devices or applications may be offloaded to an edge-cloud server to enhance the user's service experience. In addition, in order to meet requirements of a next generation wireless communication networks, small base stations (SBSs) with low powers and short distances are arranged in coverage of macro base stations (MBSs) in the ultra-dense network (UDN), effectively improving network throughput and access capacity. As shown in FIG. 1, MEC and UDN are integrated, so that the users can enjoy ubiquitous network computing services anywhere and anytime, thereby facilitating the continuity of task computing offload.

However, the actual UDN system supporting MEC has the following problems. (1) With the rapid growth of cloud-oriented devices, applications and data in the era of the Internet of Things, the conventional centralized optimization framework requires accurate information (such as traffic features, network loads and channel state information (CSI)) about system states, which is inefficient for the complex and time-varying UDN supporting MEC with many heterogeneous Internet of Things applications. (2) Due to random movement, mobile devices frequently switch between different wireless edge-cloud access points, increasing the cost of task re-offloading and resource reallocation and seriously reducing the computation offloading performance. According to the conventional technology, the following results are achieved. (1) Mobility aware and dynamic migration services for the internet of vehicles (referring to: I. Labriji, F. Meneghello, D. Cecchinato, S. Sesia, E. Perraud, E. C. Strinati and M. Rossi, "Mobility Aware and Dynamic Migration of MEC Services for the Internet of Vehicles," IEEE Transactions on Network and Service Management, vol. 18, no. 1, pp. 570-584, March 2021) are achieved. According to the algorithm, by using an MEC server, dwell time is predicted and proportional computation offloading is performed. (2) Energy-efficient and delay-guaranteed workload distribution algorithm applied in IoT-Edge-Cloud computing systems (referring to: M. Guo, L. Li and Q. Guan, "Energy-Efficient and Delay-Guaranteed Workload Allocation in IoT-Edge-Cloud Computing Systems," IEEE Access, vol. 7, pp. 78685-78697, 2019). According to the algorithm, there are many kinds of lightweight edge-cloud servers having different function features which cannot respond to sudden computation requirements quickly and timely, and there is an uncertain waiting delay for offloading a task in the server (including task queue, decompression, security analysis, and the like), which indicates that offloading and resource allocation decisions should consider a network edge (a communication factor) and should further consider a service edge (an actual available computing power factor), especially for the delay-sensitive applications. However, requirements for task offloading demands in stochastic and time-varying network environments are lacking in the conventional technology.

SUMMARY

In order to meet the growing requirements for large-scale Internet of Things applications in a stochastic and time-varying network environment, a distributed computation offloading method based on computation-network collaboration in a stochastic network is provided according to a first aspect of the present disclosure. The distributed computation offloading method may include:

- establishing a local computing model and an edge-cloud computing model based on differentiated service quality requirements, task processing costs, and the type of a device in a UDN environment;
- establishing, based on the local computing model and the edge-cloud computing model, a device revenue maximization problem model by using a Lyapunov optimization theory and a minimum drift decreasing utility function at the device;
- establishing, based on the local computing model and the edge cloud computing model, a MEC server revenue maximization problem model by using a maximum value theory at an MEC server;
- respectively establishing, based on a random movement of a user and a burst computation requirement, a composite scenario set based on a dwell time period and a composite scenario set based on a waiting delay;
- performing compensation on a game strategy by using a posteriori recourse action, and establishing a game-based stochastic programming model for the device and the MEC server, establishing a scenario tree to transform a multi-stage stochastic programming problem of the device and the MEC server to a DEP problem;
- solving an optimization problem of the device and an optimization problem of the MEC server based on a Lagrangian multiplier and a KKT condition to obtain an optimal task offloading strategy of the device to the MEC server and an optimal quotation strategy of the MEC server to the device; and
- in a case that each of the optimal task offloading strategy of the device to the MEC server and the optimal quotation strategy of the MEC server to the device meets a Stackelberg equilibrium solution, offloading, by the device based on the optimal task offloading strategy, a task to the MEC server.

In some embodiments, the establishing a device revenue maximization problem model includes:

$$\max_{f_{i,L}(t), D_{i,k}(t)} Y_{b_i}(t) = V_i \cdot U_{b_i}[D_i(t)] + \sum_{k \in \{L,M,S\}} Q_i(t) \cdot D_{i,k}(t) - Q_i(t) \cdot A_i(t),$$

and constraints include:

$T_{i,L}^{pt}(t) \leq \tau_i^d,$ $f_{i,L}^{min} \leq f_{i,L}(t) \leq f_{i,L}^{max}, t \in T,$ $0 \leq D_i(t) \leq Q_i(t), t \in T,$ and $$\overline{Q_i(t)} = \lim_{T \to +\infty} \sup \frac{1}{T} \sum_{t=0}^{T-1} E\{Q_i(t)\} \leq +\infty;$$

where $f_{i,L}(t)$ represents a CPU clock frequency set of an i-th device, $D_{i,k}(t)$ represents an offloading task set in a time slot t, $Y_{b_i}(t)$ represents a long-term revenue of the i-th device, $V_i$ represents a non-negative control parameter in the Lyapunov optimization theory, $D_{i,k}(t)$ represents an offloading task for an i-th mobile device, $A_i(t)$ represents a task arriving at the i-th mobile device in the time slot t, T represents a time slot index and T={0, 1, ... }, $U_{b_i}[D_i(t)]$ represents a total revenue of the i-th device in the time slot t; $k \in \{L, M, S\}$ represents a current task type, L represents a non-offloading task, M represents a task offloaded to a macro base station, S represents a task offloaded to a small base station; $T_{i,L}^{pt}(t)$ represents a time period in which a local server processes an offloaded task, $\tau_i^d$ represents a maximum computation delay constraint of $D_i(t)$, $f_{i,L}^{min}$ represents a minimum CPU clock frequency allocated for the i-th mobile device in the time slot t, $f_{i,L}(t)$ represents a CPU clock frequency allocated for the i-th mobile device in the time slot t, $f_{i,L}^{max}$ represents a maximum CPU clock frequency allocated for the i-th mobile device in the time slot t, $D_i(t)$ represents a task processing decision at a beginning of the time slot t, $Q_i(t)$ represents a task queue backlog at the beginning of the time slot t, and $\overline{Q_i(t)}$ represents an average queue backlog.

In some embodiments, in a case that a task is offloaded to a macro base station, the MEC server revenue maximization problem model is expressed as:

$$\max_{p_M(t), \beta_{i,l_M}} Y_{S_M}(t) = u_M[p_M(t)] - \sum_{\forall i} e_{i,M}[D_{i,M}(t), T_{i,M}^{wt}(t)],$$

and constraints include:

$p_{i,M}(t) \geq 0, t \in T,$ $T_{i,M}^{co}(t) \leq \tau_i^d, t \in T,$ and $\beta_{l_M}^{min} \leq \beta_{i,l_M}(t) \leq \beta_{l_M}^{max}, t \in T;$ where $p_M(t)$ represents a pricing set of the macro base station in a time slot t, $\beta_{i,l_M}$ represents a computing capacity set allocated to the macro base station, $Y_{S_M}(t)$ represents a revenue of the macro base station, $u_M[p_M(t)]$ represents a service utility of the macro base station, $e_{i,M}[D_{i,M}(t), T_{i,M}^{wt}(t)]$ represents a task computing energy consumption of the macro base station, $p_{i,M}(t)$ represents a payment cost of an i-th device in the time slot t to the macro base station, T represents a time slot index and T={0, 1, ... }, $T_{i,M}^{co}(t)$ represents a total computation offloading time period of the macro base station in the time slot t, $\tau_i^d$ represents a maximum computation delay constraint of $D_i(t)$, $\beta_{l_M}^{min}$ represents a minimum frequency of each of CPU cores in the macro base station, $\beta_{i,l_M}(t)$ represents a frequency of an i-th CPU core in the macro base station, and $\beta_{l_M}^{max}$ represents a maximum frequency of each of the CPU cores in the macro base station.

In some embodiments, in a case that a task is offloaded to a small base station, the MEC server revenue maximization problem model is expressed as:

$$\max_{p_S(t), \beta_{i,l_S}} Y_{S_S}(t) = u_S[p_S(t)] - \sum_{\forall i} e_{i,S}[D_{i,S}(t), T_{i,S}^{st}(t), T_{i,S}^{wt}(t)],$$

and constraints include:

$p_{i,S}(t) \geq 0, t \in T,$ $T_{i,S}^{co}(t) \leq \tau_i^d, t \in T,$ and $\beta_{l_S}^{min} \leq \beta_{i,l_S}(t) \leq \beta_{l_S}^{max}, t \in T;$ where $p_S(t)$ represents a pricing set of the small base station in a time slot t, $\beta_{i,l_M}$ represents a computing capacity set allocated to the small base station, $Y_{S_S}(t)$ represents a revenue of the small base station, $u_S[p_S(t)]$ represents a service utility of the small base station, $e_{i,S}[D_{i,S}(t), T_{i,S}^{st}(t), T_{i,S}^{wt}(t)]$ represents a task computing energy consumption of the small base station, $p_{i,S}(t)$ represents a payment cost of an i-th device in the time slot t to the small base station, T represents a time slot index and T={0, 1, ... }, $T_{i,S}^{co}(t)$ represents a total computation offloading time period of the small base station in the time slot t, $\tau_i^d$ represents a maximum computation delay constraint of $D_i(t)$, $\beta_{l_S}^{min}$ represents a minimum frequency of each of CPU cores in the small base station, $\beta_{i,l_S}(t)$ represents a frequency of an i-th CPU core in the small base station, and $\beta_{l_S}^{max}$ represents a maximum frequency of each of the CPU cores in the small base station.

In some embodiments, the establishing a composite scenario set based on a dwell time period and a composite scenario set based on a waiting delay includes:

in a case that a possible dwell time period and a possible waiting time period of a mobile device in a small base station are known, obtaining, based on a Cartesian product, a composite scenario based on dwell time periods of all mobile devices and a composite scenario based on waiting delays of all the mobile devices, wherein a composite scenario set based on the dwell time periods of all the mobile devices is expressed as:

$\Omega_S(t) = \Omega_S^{st}(t) * \Omega_S^{wt}(t),$ $$\Omega_S^{st}(t) = \prod_{i=1}^{m} \Omega_{i,S}^{st}(t) = \Omega_{1,S}^{st}(t) * \ldots * \Omega_{m,S}^{st}(t), \text{ and}$$

$$\Omega_k^{wt}(t) = \prod_{i=1}^{m} \Omega_{i,k}^{st}(t) = \Omega_{1,k}^{wt}(t) * \ldots * \Omega_{m,k}^{wt}(t);$$

where m represents the number of the mobile devices, $\Omega_{i,S}^{st}(t)$ represent a composite scenario based on a dwell time period of an i-th mobile device, and $\beta_{i,k}^{wt}(t)$ represents a composite scenario based on a waiting delay of the i-th mobile device.

In some embodiments, compensation is performed on the game strategy by using the posteriori recourse action, that is, a two-stage optimal programming model is adopted, parameters are obtained based on the device revenue maximization problem model and the MEC server revenue maximization problem model in a first stage, compensation is performed on the parameters obtained in the first stage by using the posteriori recourse action in a second stage, and the device revenue maximization problem model after the compensation performed by using the posterior recourse action is expressed as:

$$\max_{f_{i,L}(t), D_{i,k}(t)} Y_{b_i}(t) =$$

$$V_i \Big\{ u_i[D_i(t)] - s_i[D_i(t)] - E_{\Omega_{i,S}^{st}(t)} \{c_i(D_{i,t}(t), T_{i,S}^{st}(t) \mid T_{i,S}^{st}(t) \in \Omega_{i,S}^{st}(t))\} - E_{\Omega_{i,S}^{st}(t)}$$

$$\{e_{i,L}(D_{i,t}(t), T_{i,S}^{st}(t) \mid T_{i,S}^{st}(t) \in \Omega_{i,S}^{st}(t))\} \Big\} + \sum_{k \in \{L,M,S\}} Q_i(t) D_{i,k}(t) - Q_i(t) A_i(t),$$

and constraints include:

$T_{i,L}^{pt}(t) \leq \tau_i^d,$ $f_{i,L}^{min} \leq f_{i,L}(t) \leq f_{i,L}^{max}, t \in T,$ $0 \leq D_i(t) \leq Q_i(t), t \in T,$ and $$\overline{Q_i(t)} = \lim_{T \to +\infty} \sup \frac{1}{T} \sum_{t=0}^{T-1} E\{Q_i(t)\} \leq +\infty;$$

in a case that a task is offloaded to a small base station, the MEC server revenue maximization problem model after the compensation performed by using the posterior recourse action is expressed as:

$$\max_{p_S(t), \beta_{i,l_S}(t)} Y_{s_S}(t) = u_S[p_S(t)] - E_{\Omega_S(t)}[R(\beta_{i,l_S}(t), \Omega_S(t))],$$

and constraints include:

$p_{i,S}(t) \geq 0, t \in T,$ $T_{i,S}^{co}(t) \leq \tau_i^d, t \in T,$ and $\beta_{l_S}^{min} \leq \beta_{i,l_S}(t) \leq \beta_{l_S}^{max}, t \in T;$ where $f_{i,L}(t)$ represents a CPU clock frequency set of an i-th device, $D_{i,k}(t)$ represents an offloading task set, $Y_{b_i}(t)$ represents a long-term revenue of the i-th device, $V_i$ represents a non-negative control parameter in the Lyapunov optimization theory, $u_i[D_i(t)]$ represents a utility of the i-th device, $s_i[D_i(t)]$ represents a computation service cost of the i-th device, $E_{\Omega_{i,S}^{st}(t)}\{c_i(D_{i,t}(t), T_{i,S}^{st}(t) \mid T_{i,S}^{st}(t) \in \Omega_{i,S}^{st}(t))\}$ represents an average communication cost in a composite scenario $\Omega_{i,S}^{st}(t)$, $E_{\Omega_{i,S}^{st}(t)}\{e_{i,L}(D_{i,t}(t), T_{i,S}^{st}(t) \mid T_{i,S}^{st}(t) \in \Omega_{i,S}^{st}(t))\}$ represents an average energy consumption cost in the composite scenario $\Omega_{i,S}^{st}(t)$, $D_{i,k}(t)$ represents an offloading task for the i-th mobile device, $A_i(t)$ represents a task arriving at the i-th mobile device in a time slot t, T represents a time slot index and T={0, 1, ... }, $U_{b_i}[D_i(t)]$ represents a total revenue of the i-th device in the time slot t, k∈{L, M, S} represents a current task offloading position, L indicates that a task is offloaded locally, M indicates that a task is offloaded to a macro base station, S indicates that a task is offloaded to a small base station, $T_{i,L}^{pt}(t)$ represents a time period in which a local server processes an of loaded task, $\tau_i^d$ represents a maximum computation delay constraint of $D_i(t)$, $f_{i,L}^{min}$ represents a minimum CPU clock frequency allocated for the i-th mobile device in the time slot t, $f_{i,L}(t)$ represents a CPU clock frequency allocated for the i-th mobile device in the time slot t, $f_{i,L}^{max}$ represents a maximum CPU clock frequency allocated for the i-th mobile device in the time slot t, $D_i(t)$ represents a task processing decision at a beginning of the time slot t, $Q_i(t)$ represents a task queue backlog at the beginning of the time slot t, $\overline{Q_i(t)}$ represents an average queue backlog, $Y_{s_S}(t)$ represents a revenue of a small base station, $u_S[p_S(t)]$ represents a service utility of the small base station, $E_{\Omega_{S(t)}}[R(\beta_{i,l_S}(t), \Omega_S(t))]$ represents an average recourse in a composite scenario $\Omega_{i,S}^{st}(t)$, $p_{i,M}(t)$ represents a payment cost of the i-th device to the macro base station in the time slot t, T represents a time slot index and T={0, 1, ... }, $T_{i,M}^{co}(t)$ represents a total computation offloading time period of the macro base station in the time slot t, $\tau_i^d$ represents a maximum computation delay constraint of $D_i(t)$, $\beta_{l_M}^{min}$ represents a minimum frequency of each of CPU cores in the macro base station, $\beta_{i,l_M}(t)$ represents a frequency of an i-th CPU core in the macro base station, and $\beta_{l_M}^{max}$ represents a maximum frequency of each of the CPU cores in the macro base station.

In some embodiments, a recourse function $R(\beta_{i,l_S}(t), \Omega_S(t))$ is expressed as:

$$R(\beta_{i,l_S}(t), \Omega_S(t)) = \sum_{\forall i} e_{i,S}[D_{i,S}(t), T_{i,S}^{st}(\omega_S(t)), T_{i,S}^{wt}(\omega_s(t))]$$

where $e_{i,S}[D_{i,S}(t), T_{i,S}^{st}(\Omega_S(t)), T_{i,S}^{wt}(\omega_S(t))]$ represents an energy consumption cost of the small base station.

In some embodiments, a task offloading process is divided into H sub-time slots, a distributed programming model with 2H stages is obtained, and the device revenue maximization problem model is expressed as:

$$\max_{f_{i,L}(\tau_h), D_{i,k}(\tau_h)} Y_{b_i}\{D_i(\tau_1), \ldots, D_i(\tau_H), f_{i,L}(\tau_1), \ldots, f_{i,L}(\tau_H)\} =$$

$$V_i \Big\{ u_i[D_i(\tau_1)] - c_i[D_i(\tau_1)] - e_{i,L}[D_i(\tau_1)] - s_i[D_i(\tau_1)] +$$

$$E_{\xi_{i,S}^{st}(\tau_h) \mid \xi_{i,S}^{st}(\tau_{h-1})} \sum_{h=2}^{H} \{u_i[D_i(\tau_h)] - s_i[D_i(\tau_h)]\} - E_{\xi_{i,S}^{st}(\tau_h) \mid \xi_{i,S}^{st}(\tau_{h-1})}$$

$$\sum_{h=2}^{H} c_i[D_i(\tau_h), T_{i,S}^{st}(\tau_h)] - E_{\xi_{i,S}^{st}(\tau_h) \mid \xi_{i,S}^{st}(\tau_{h-1})} \sum_{h=2}^{H} e_{i,L}[D_i(\tau_h), T_{i,S}^{st}(\tau_h)] \Big\} +$$

$$Q_i(\tau_1) D_i(\tau_1) + E_{\xi_{i,S}^{st}(\tau_h) \mid \xi_{i,S}^{st}(\tau_{h-1})} \sum_{h=2}^{H} Q_i(\tau_h) D_j(\tau_h) - Q_i(\tau_1) A_i(\tau_1) -$$

$$E_{\xi_{i,S}^{st}(\tau_h) \mid \xi_{i,S}^{st}(\tau_{h-1})} \sum_{h=2}^{H} Q_i(\tau_h) A_i(\tau_h)$$

and constraints include:

$$f_{i,L}^{min} \le f_{i,L}(\tau_h) \le f_{i,L}^{max}, \tau_h \in H,$$

$$\sum_{h=1}^{H} D_i(\tau_h) = D_i(\tau_h), \tau_h \in H, \text{ and}$$

$$0 \le \sum_{h=1}^{H} D_i(\tau_h) \le Q_i(\tau_h), \tau_h \in H;$$

in the case that the task is offloaded to the small base station, the MEC server revenue maximization problem model is expressed as:

$$\max_{p_{i,S}(\tau_h), \beta_{i,S}(\tau_h)} Y_{s_S}\{p_{i,S}(\tau_1), \ldots, p_{i,S}(\tau_H), \beta_{i,S}(\tau_1), \ldots, \beta_{i,S}(\tau_H)\} =$$

$$u_S[p_S(\tau_1)] - \sum_{i=1}^{m} \{e_{i,S}[D_{i,S}(\tau_1)] + p_{i,S}^f[D_{i,S}(\tau_1)]\} + E_{\xi_S(\tau_h)|\xi_S(\tau_{h-1})|}$$

$$\sum_{h=2}^{H} u_S[p_S(\tau_h)] - E_{\xi_S(\tau_h)|\xi_S(\tau_{h-1})} \sum_{i=1}^{m} \sum_{h=2}^{H} e_{i,S}[D_{i,S}(\tau_h), T_{i,S}^{st}(\tau_h), T_{i,S}^{wt}(\tau_h)]$$

and constraints include:

$$p_{i,S}(\tau_h) \ge 0, \tau_h \in H,$$

$$E_{\xi_S}\left\{\sum_{h=1}^{H}\left[T_{i,S}^{up}(\tau_h) + T_{i,S}^{wt}(\tau_h) + \sum_{l_k \in L_k} \frac{D_i(\tau_h)\gamma_i}{\beta_{i,l_k}}\right]\right\} \le \tau_i^d,$$

$$\beta_{l_S}^{min} \le \beta_{i,l_S}(\tau_h) \le \beta_{l_S}^{max}, \tau_h \in H;$$

where $f_{i,L}(\tau_h)$ represents a CPU clock frequency set of an i-th device in a sub-time slot $\tau_h$, $D_{i,k}(\tau_h)$ represents a offloading task set of an i-th mobile device in the sub-time slot $\tau_h$, $u_i[D_i(\tau_1)]$ represents a utility of the i-th mobile device in a root node, $c_i[D_i(\tau_1)]$ represents a communication cost of the i-th mobile device in the root node, $e_{i,L}[D_i(\tau_1)]$ represents an energy consumption cost of the i-th mobile device in the root node, $s_i[D_i(\tau_1)]$ represents a computation service cost of the i-th mobile device in the root node, $T_{i,S}^{st}(\tau_h)$ represents a dwell time period of the i-th mobile device in the small base station in the sub-time slot $\tau_h$, $D_i(\tau_h)$ represents a processed task of the i-th mobile device in the sub-time slot $\tau_h$, $f_{i,L}(\tau_h)$ represent a local computation frequency of the i-th mobile device in the sub-time slot $\tau_h$; $Q_i(\tau_h)$ represents a task queue backlog in the sub-time slot $\tau_h$, $\xi_{i,S}^{st}(\tau_h)$ represents a dwell time period in the sub-time slot $\tau_h$, and $A_i(\tau_1)$ represents a task arriving at the i-th mobile device in the root node.

In some embodiments, the optimal strategy of the device is obtained based on the Lagrangian multiplier and the KKT condition by using the following equations:

$$f_{i,L}^*(t) = \left(\frac{\rho_i}{A_L \cdot \ln 2} - 1\right)\frac{\gamma_i}{\tau_i^d}, t \in T, \text{ and}$$

$$D_{i,k}^*(t) = \frac{\rho_i}{A_k \cdot \ln 2} - 1, k \in \{M, S\}, t \in T; \text{ and}$$

the optimal quotation strategy of the MEC server to the device is obtained based on the Lagrangian multiplier and the KKT condition by using the following equation:

$$p_{i,k}^*(t) = 2\lambda_k k_{l_k} \frac{D_{i,k}^*(t)\gamma_i^2}{T_{i,k}^{pt}} - \frac{D_{i,k}^*(t)}{\Theta_k};$$

where, $f^*_{i,L}(t)$ represents an optimal local computation frequency, $\rho_i$ represents a utility weight parameter of an i-th mobile user, $A_L$ represents a locally arriving task set, $\gamma_i$ represents a computation density in cycles/bit obtained by performing an offline measurement, $\tau_i^d$ represents a maximum computation delay constraint of $D_i(t)$, $D^*_{i,k}(t)$ represents an optimal offloading strategy, $\rho^*_{i,k}(t)$ represents an optimal quotation strategy of a base station, $\lambda_k$ represents a unit energy consumption, $k_{l_k}$ represents an effective switching capacitance in the MEC server, $D^*_{i,k}(t)$ represents an optimal offloading strategy, $T_{i,k}^{pt}$ represents a processing time period for offloading a task, and $$\Theta_k = \frac{\partial D_{i,k}^*(t)}{\partial p_{i,k}(t)}, k \in \{M, S\},$$

represents a first-order derivative of the optimal offloading strategy to a quotation.

With the extended game theory method based on the Lyapunov optimization theory according to the present disclosure, dynamic task offloading and adaptive computation power management in a time-varying environment are performed. Further, considering the uncertainty of computation and networks caused by the movements of the users and the limited edge resources, a distributed two-stage stochastic programming algorithm and a distributed multi-stage stochastic programming algorithm in a condition that multiple objectives are uncertain are provided. Furthermore, posteriori remedies are performed to compensate for inaccurate predicted network information according to the present disclosure.

BRIEF DESCRIPTION OF THE DRAWINGS

FIG. 2 shows a flowchart of a distributed computing power and network collaboration method based on a ultra-dense network under multi-objective uncertainty according to the present disclosure;

DETAILED DESCRIPTION OF THE EMBODIMENTS

The technical solutions in the embodiments of the present disclosure will be clearly and completely described below in conjunction with the accompanying drawings in the embodiments of the present disclosure. It is apparent that the embodiments described are only a part of the embodiments of the present disclosure rather than all of the embodiments. Based on the embodiments of the present disclosure, all other embodiments obtained by those skilled in the art without creative efforts fall within the scope of protection of the present disclosure.

FIG. 2 shows a flowchart of a distributed computation offloading method based on computation-network collaboration in a stochastic network according to the present disclosure. The method includes the following steps:

establishing a local computing model and an edge-cloud computing model based on differentiated service quality requirements, task processing costs, and the type of a device in a UDN environment;

establishing, based on the local computing model and the edge-cloud computing model, a device revenue maximization problem model by using a Lyapunov optimization theory and a minimum drift decreasing utility function at the device;

establishing, based on the local computing model and the edge cloud computing model, a MEC server revenue maximization problem model by using a maximum value theory at an MEC server;

respectively establishing, based on a random movement of a user and a burst computation requirement, a composite scenario set based on a dwell time period and a composite scenario set based on a waiting delay;

performing compensation on a game strategy by using a posteriori recourse action, and establishing a game-based stochastic programming model for the device and the MEC server;

establishing a scenario tree to transform a multi-stage stochastic programming problem of the device and the MEC server to a DEP problem;

solving an optimization problem of the device and an optimization problem of the MEC server based on a Lagrangian multiplier and a KKT condition to obtain an optimal task offloading strategy of the device to the MEC server and an optimal quotation strategy of the MEC server to the device; and in a case that both the optimal task offloading strategy of the device to the MEC server and the optimal quotation strategy of the MEC server to the device meet a Stackelberg equilibrium solution, offloading, by the device based on the optimal task offloading strategy, a task to the MEC server.

First Embodiment

In the embodiment, the process of establishing a local computing model and an edge-cloud computing model based on differentiated service quality requirements, task processing costs, and the type of a device in a UDN environment according to the present disclosure is described in detail.

Figure 1:
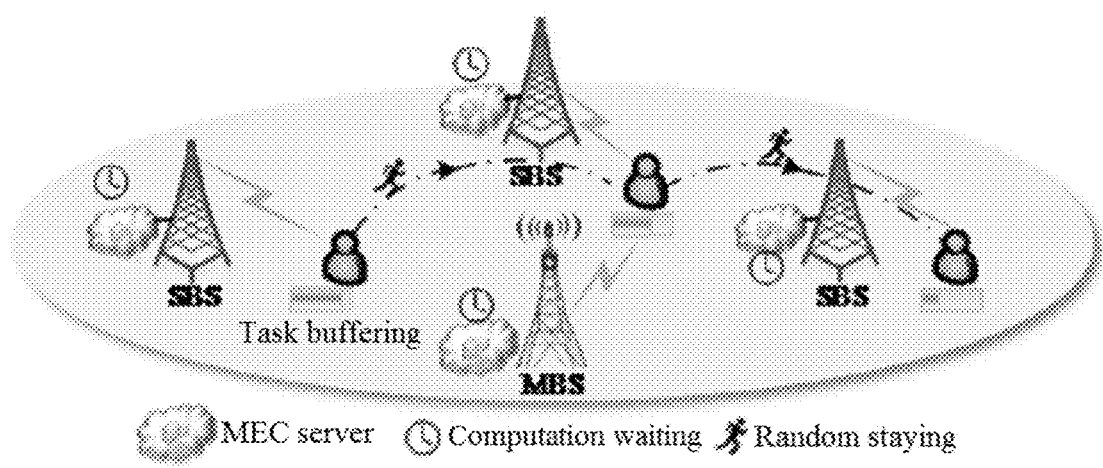
FIG. 1 shows a typical UDN environment supporting MEC.

In the embodiment, as shown in FIG. 1, a UDN system that supports MEC and operates in discrete time is considered. It is assumed that T={0, 1, ... } and $\tau \in T$, where T represents a time slot index and $\tau$ represents a time length of each of time slots, the system includes a macro base station (MBS) and n small base stations (SBS), N={1, ..., n} and N represents a set of n SBSs, M represents the MBS, SEN and S represents an S-th SBS, M={1, ..., m} and M represents m mobile devices (MDs), each of base stations is arranged with an MEC server where the MEC server has computing power and may provide computing power to MDs in a coverage region of the base station, each of the MDs may process tasks locally or offload a task to a MEC server of a base station, and each of the MDs may be connected to a MBS and a nearby SBS by using a dual connection in a 5G network or a CoMP technology.

It is assumed that $MD_i$ represents an i-th mobile device, a task requested to be processed by $MD_i$ may be represented by a quaternion $\Lambda_i(t) = \langle Q_i(t), D_i(t), \tau_i^d, \gamma_i \rangle$, where $Q_i(t)$ represents a task queue backlog at a beginning of a time slot t and $D_i(t)$ represents a task processing decision at the beginning of the time slot t, $\tau_i^d$ represents a maximum computation delay constraint of $D_i(t)$, and $\gamma_i$ represents a computation density in cycles/bit that may be obtained by performing an offline measurements.

It is assumed that $A_i(t)$ represents a task arriving at $MD_i$ ($i \in M$) and $A(t) = \{A_i(t), \ldots, A_m(t)\}$ represents a set of all MDs in the time slot t. Since the tasks arriving in onetime slot are limited, $0 \leq A_i(t) \leq A_i^{max}$, $t \in T$, where $A_i^{max}$ represents a maximum number of arriving tasks. It is assumed that task arrival rates of all the MDs meet an independent and identical distribution. An update equation for the queue backlog of MD i may be expressed as:

$$Q_i(t+1) = [Q_i(t) - D_i(t)]^+ + A_i(t), i \in M, t \in T$$

where $$[x]^+ = \max(x, 0), D_i(t) = D_{i,L}(t) + \sum_{k \in \{M,S\}} D_{i,k}(t), D_{i,L}(t)$$

represents a task backlog processed locally, $D_{i,M}(t)$ represents a task backlog processed by the MBS, and $D_{i,S}(t)$ represent a task backlog processed by a SBS.

Figure 3:
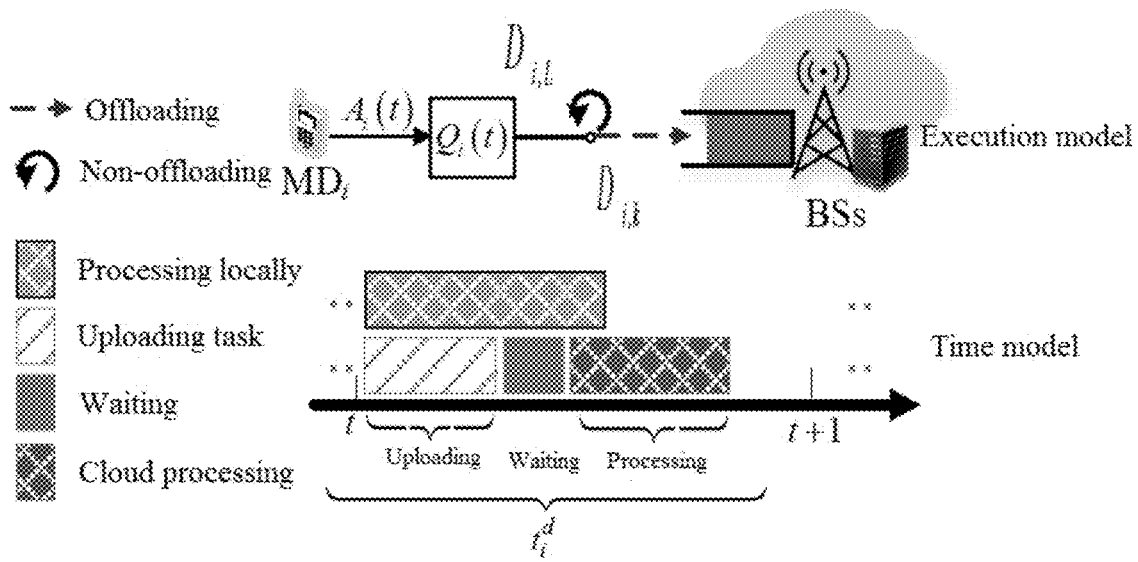
FIG. 3 shows a task processing and time slot model according to the present disclosure.

At a beginning of each of time slots, it is required for each of mobile devices to determine a task offloading strategy to determine the number of non-offloading tasks $D_{i,L}(t)$ and the number of offloading tasks $D_{i,k}(t)$, where $k \in \{M,S\}$. As shown in FIG. 3, an offloading process includes the following three stages.

In a first stage, each of the MDs uploads a computation task $D_{i,k}(t)$ to a BS through a wireless channel, where $T_{i,k}^{up}(t)$ represents a task upload delay.

In a second stage, the task uploaded by each of the MDs waits in a server for a time period which is referred to as a waiting delay $T_{i,k}^{wt}(t)$.

In a third stage, the offloaded task is to be processed by the server, and $T_{i,k}^{pt}(t)$ represents a processing time period.

It is required to process the offloaded task in a constraint time length $\tau_i^d$. In a case that the offloaded task is not processed in the constraint time length $\tau_i^d$, it is determined that the task is failed to be processed.

Since a capacity of a battery of a mobile device is limited, in order to save energy in limited time, a MD may process a task at a CPU clock frequency determined based on a dynamic voltage and frequency scaling (DVFS) technology. It is assumed that $$D_{i,L}(t) = \int_{T_{i,L}^{pt}(t)} \frac{f_{i,L}(t)}{\gamma_i} dt$$

represents a relationship between processed tasks and local computing resources, where $T_{i,L}^{pt}(t) \leq \tau_i^d$ and represents a local execution time period, $f_{i,L}(t)$ ($f_{i,L}^{min} \leq f_{i,L}(t) \leq f_{i,L}^{max}$) represents a CPU clock frequency (cycle/s) allocated in a time slot, $f_{i,L}^{min}$ represents a minimum CPU clock frequency of MD i, and $f_{i,L}^{max}$ represents a maximum CPU clock frequency of MD i.

For each of the MDs, it is assumed in the present disclosure that the energy of the device is mainly consumed by the operation of the CPU. Generally, $$E_{i,L}^{exe}(t) = k_i \int_{T_{i,L}^{pt}(t)} (f_{i,L}(t))^2 dt$$

represents energy consumption due to operation of a CPU, where $k_i$ represents an effective energy factor, is related to a chip structure of the device and may be obtained by performing an offline measurements.

In the present disclosure, it is assumed that: (1) in a case that a MD is located both in a coverage region of a MBS and in coverage regions of SBSs, the MD may simultaneously communicate with the MBS and a nearby SBS in each of time slots, that is, the MD may offload a task to both the MBS and the nearby SBS; (2) due to random movements of the MDs and burst computation requirements, a dwell time periods $T_{i,S}^{st}(t)$, $i \in M$ of a MD in a SBS and waiting delays $T_{i,k}^{wt}(t)$, $k \in \{M,S\}$ of the MD in the different BSs are random and meet an independent identical distribution; and (3) in a case that a MD leaves a wireless coverage region of a SBS while the MD uploading a task to the SBS (where the uploaded task is represented by $D_{i,S}^{tr}(t)$), it is required to firstly upload remaining tasks ($D_{i,S}(t) - D_{i,S}^{tr}(t)$) to the MBS, and then the MBS forwards the remaining tasks to another SBS via a wired optical network.

For a delay-sensitive application, an uploading delay of a task should be less than a constraint time length, that is, $T_{i,k}^{up}(t) < \tau_i^d$. In a case that uploading delay of the task is not less than the constraint time length, it is certain that the task is to be executed unsuccessfully. Since calculation results are usually much smaller than inputted tasks of most applications, time cost for downloading calculation results from base stations is ignored in the present disclosure. Once a MD decides to offload a task to the MBS and a nearby SBS, the task uploading delay and communication energy cost are calculated as follows.

(1) Offloading a Task to a MEC Server of the MBS

For each of the MDs, it is required to transmit input bits of a task to the MBS through a wireless channel. It should be noted that an interference environment of the UDN becomes complex as the number of the users increases. Therefore, for a offloading decision, power interferences between devices should be considered. According to a Shannon-Hartley formula, an upload data rate is obtained by using the following equation:

$$r_{i,M}(t) = \omega_M \log_2 \left( 1 + \frac{P_i(t) g_{i,M}(t)}{\sigma^2(t) + \sum_{x \in M \setminus x=i} P_x g_{x,M}(t) \cdot 1(D_{x,M}(t))} \right)$$

where $W_M$ represents a radio bandwidth, $g_{i,M}(t)$ represents a channel gain of the MBS, $\sigma^2(t)$ represents an average background noise power, $P_i(t)$ represents a communication power of a MD i in a time slot t, and $1(\cdot)$ represents an indicator function.

Therefore, for the MBS, the task uploading delay is obtained by using the following equation:

$$T_{i,M}^{up}(t) = \frac{D_{i,M}(t)}{r_{i,M}(t)}, i \in M,$$

the communication energy consumption is obtained by using the following equation:

$$E_{i,M}^{up}(t) = P_i(t) \frac{D_{i,M}(t)}{r_{i,M}(t)}, i \in M.$$

(2) Offloading a Ask to a MEC Server of a SBS

In a case that a MD i offloads a task $D_{i,S}(t)$ to a MEC server of a SBS, an uploading data rate is obtained by using the following equation:

$$r_{i,S}(t) = \omega_S \log_2 \left( 1 + \frac{P_i(t) g_{i,S}(t)}{\sigma^2(t) + \sum_{X \in M \setminus x=i} P_x g_{x,S}(t) \cdot 1(D_{x,S}(t))} \right)$$

where $\omega_S$ represents a wireless bandwidth, and $g_{i,S}(t)$ represents a channel gain of the SBS.

Generally, a wireless coverage region of a SBS is smaller than a wireless coverage region of a MBS. Based on the assumptions mentioned above, in a case that a MD leaves a wireless coverage region of a SBS while the MD uploading a task, the remaining tasks are firstly uploaded to the MBS and then are forwarded to another SBS. Therefore, an uploading delay of a SBS is obtained by using the following equation:

$$T_{i,S}^{up}(t) = \begin{cases} T_{i,S}^{st}(t) + T_{i,M}^{\hat{u}p} + T_{i,M}^{f}, & \text{if } T_{i,S}^{st}(t) < \frac{D_{i,S}(t)}{r_{i,S}(t)} \\ \frac{D_{i,S}(t)}{r_{i,S}(t)}, & \text{if } T_{i,S}^{st}(t) \geq \frac{D_{i,S}(t)}{r_{i,S}(t)} \end{cases}$$

where $T_{i,S}^{st}(t)$ represents a dwell time period of the MD i in the SBS, $$T_{i,M}^{\hat{u}p} = \frac{D_{i,S}(t) - T_{i,S}^{st}(t) r_{i,S}(t)}{r_{i,M}(t)}$$

represents an uploading delay for the remaining tasks, $$T_{i,M}^{f} = \frac{D_{i,S}(t) - T_{i,S}^{st}(t) r_{i,S}(t)}{c}$$

represents a forwarding time period of the remaining tasks, and c represents a data rate of an optical link.

Therefore, the communication energy consumption of the MD i uploading $D_{i,S}(t)$ to the SBS is obtained by using the following equation:

$$E_{i,S}^{up}(t) = \begin{cases} P_i(t)\left(T_{i,S}^{st}(t) + T_{i,M}^{\hat{u}p}\right), & \text{if } T_{i,S}^{st}(t) < \frac{D_{i,S}(t)}{r_{i,S}(t)} \\ P_i(t)\frac{D_{i,S}(t)}{r_{i,S}(t)}, & \text{if } T_{i,S}^{st}(t) \geq \frac{D_{i,S}(t)}{r_{i,S}(t)} \end{cases}$$

A total energy consumption of the MD I in the time slot t is obtained by using the following equation:

$$E_{i,L}(t) = E_{i,L}^{exe}(t) + \sum_{k \in \{M,S\}} E_{i,k}^{up}(t).$$

A total computation offloading time period of the MBS/SBS is obtained by using the following equation:

$$T_{i,k}^{co}(t) = T_{i,k}^{up}(t) + T_{i,k}^{wt}(t) + T_{i,k}^{pt}(t), k \in \{M,S\}.$$

To ensure that offloaded tasks are processed timely, a total computation offloading time period $T_{i,k}^{co}(t)$ (including an uploading time period, a waiting delay and a processing time period) does not exceed a constrained time period in each of time slots (that is, $T_{i,k}^{co}(t) \leq \tau_i^d$).

It is assumed that the MEC server is arranged with a CPU having $L_k$ cores, a core set of a CPU is represented as $L_k = \{1, \ldots, L_k\}$, $k \in \{M,S\}$. A processing energy consumption of the MEC server for processing a task $D_{i,k}(t)$ is obtained by using the following equation:

$$E_{i,k}(t) = \sum_{l_k \in L_k} k_{l_k} \left(\beta_{i,l_k}(t)\right)^2 T_{i,k}^{pt}(t), k \in \{M, S\}$$

where $k_{l_k}$ represents an effective switching capacitance in the MEC server, $\beta_{i,l_k}(t)$ ($\beta_{i_k}^{min} \leq \beta_{i,l_k}(t) \leq \beta_{i_k}^{max}$) represents a CPU clock frequency of a $l_k$-th CPU core in the MEC server, $\beta_{i_k}^{min}$ represents a minimum CPU clock frequency of each of CPU cores, and $\beta_{i_k}^{max}$ represents a maximum CPU clock frequency of each of the CPU cores.

Second Embodiment

In the embodiment, resource cost to be consumed for processing a task is calculated based on the local computing model and the edge-cloud computing model established in the first embodiment.

Based on the local computing model and the edge-cloud computing model established in the first embodiment, it can be seen that the computation offload delay strongly relies on the communication delay, the waiting delay and the processing delay of the task. In order to ensure that an offloaded task is processed in the constrained time period $\tau_i^d$, computation factors (including a computation waiting time period $T_{i,k}^{wt}(t)$, a computation power $f_{i,L}$ and $\beta_{i,l_k}(t)$) and network factors (including a dwell time period $T_{i,S}^{st}(t)$ and a communication time period $T_{i,k}^{up}(t)$) are required to be considered.

In order to evaluate a task processing performance, a task processing utility function and a task processing cost function are defined in the present disclosure. For each of the MDs, in order to evaluate a revenue for processing a task in each of the time slots, a logarithmic utility function is adopted in the present disclosure, which is widely used in the field of wireless communications and mobile computations. An utility of the MD i is obtained by using the following equation:

$$u_i[D_i(t)] = \sum_{k \in \{L,M,S\}} \rho_i \log\left[1 + D_{i,k}(t)\right], t \in T$$

where $\rho_i$ is a utility weight parameter of MD i.

In a case that a transmission task of the MBS are expressed as:

$$D_{i,M}^{tr}(t) = \begin{cases} D_{i,M}(t) + D_{i,S}(t) - T_{i,S}^{st}r_{i,S}(t), & \text{if } T_{i,S}^{st}(t) < \frac{D_{i,S}(t)}{r_{i,S}(t)} \\ D_{i,M}(t); & \text{if } T_{i,S}^{st}(t) \geq \frac{D_{i,S}(t)}{r_{i,S}(t)} \end{cases},$$

and a transmission task of a SBS is expressed as:

$$D_{i,S}^{tr}(t) = \begin{cases} T_{i,S}^{st}r_{i,S}(t), & \text{if } T_{i,S}^{st}(t) < \frac{D_{i,S}(t)}{r_{i,S}(t)} \\ D_{i,S}(t), & \text{if } T_{i,S}^{st}(t) \geq \frac{D_{i,S}(t)}{r_{i,S}(t)} \end{cases}$$

communication cost of MD i is obtained by using the following equation:

$$c_i[D_i(t)] = \theta_i D_{i,M}^{tr}(t) + \eta_i D_{i,S}^{tr}(t), t \in T$$

where $\theta_i$ represents communication cost for a unit of bit of MD i in the MBS, and $\eta_i$ represents communication cost for a unit of bit of MD i in the SBS.

To simplify the analysis, it is assumed in the embodiment that a unit energy consumption cost is represented as $\lambda_k \geq 0$, $k \in \{L, M, S\}$. Therefore, the energy consumption cost is obtained by using the following equation:

$$e_{i,k}[d_i(t)] = \lambda_k E_{i,k}(t), t \in T.$$

In order to improve the user's experience for the computation offload service, a cloud server provider has to consume costs. Apparently, offload services are not free, and an edge-cloud server usually requires compensations to share resources. It is assumed that $p_{i,k}(t), k \in \{M,S\}$ ($/bit) represents a unit payment cost of MD i for BS k in a time slot t, the compute service cost of MD i is obtained by using the following equation:

$$S_i[D_i(t)] = \sum_{k \in \{M,S\}} p_{i,k}(t) D_{i,k}(t), i \in M,$$

and the service utility of the is obtained by using the following equation:

$$u_k[p_k(t)] = \sum_{\forall i \in M} p_{i,k}(t) D_{i,k}(t), k \in \{M, S\},$$

where $p_k(t) \Box [p_{1,k}(t) \ldots, p_{m,k}(t)]$ represents a price strategy set of the MBS or a price strategy set of the SBS.

Third Embodiment

Based on the local computing model and the edge-cloud computing model established in the first embodiment and the resource cost to be consumed for offloading tasks obtained in the second embodiment, a device revenue maximization problem model and a MEC server revenue maximization problem model are established based on a Lyapunov optimization theory and a minimum drift decreasing utility function in the embodiment.

In the present disclosure, the task offloading and computation resource allocation problem is described as a deterministic optimization problem, and it is assumed that the dwell time period $T_{i,S}^{st}(t)$ $S \in N$ and the computation waiting time period $T_{i,k}^{wt}(t)$, $k \in \{M,S\}$ are known in advance.

In the present disclosure, it is assumed that mobile devices are always rational, and seek an optimal offloading decision to maximize the long-term revenue. For an optimal decision of each of the MDs/buyers, an offloaded task, communication cost, energy cost and payment cost should be considered. Based on the above analysis, an objective function of a MD/buyer i in a time slot t is expressed as:

$$U_{b_i}[D_i(t)] = u_i[D_i(t)] - c_i[D_i(t), T_{i,S}^{st}(t)] - e_{i,L}[D_i(t), T_{i,S}^{st}(t)] - s_i[D_i(t)]$$

To ensure the computation performance in the long term evolution, for the MD/buyer i, the device revenue maximization problem model is expressed as:

$$P1-\text{buyer}: \max_{f_{i,L}(t), D_{i,k}(t)} \overline{U_{b_i}} = \lim_{T \to +\infty} \frac{1}{T} E \sum_{t=0}^{T-1} \{U_{b_i}[D_i(t)]\}$$

$$s.t. T_{i,L}^{Pt}(t) \leq \tau_i^d,$$

$$f_{i,L}^{min} \leq f_{i,L}(t) \leq f_{i,L}^{max}, t \in T,$$

$$0 \leq D_i(t) \leq Q_i(t), t \in T, \text{ and}$$

$$\overline{Q_i(t)} = \lim_{T \to +\infty} \sup \frac{1}{T} \sum_{t=0}^{T-1} E\{Q_i(t)\} \leq +\infty.$$

A Lyapunov function for a computation task queue of the MD i is represented as:

$$L_i(Q_i(t)) = \frac{1}{2}\{Q_i(t)\}^2$$

where $L_i(Q_i(t)) \geq 0$. Thus, a conditional Lyapunov drift is expressed as:

$$\Delta(Q_i(t)) = E\{L_i(Q_{i,t+1}) - L_i(Q_i(t))|Q_i(t)\}.$$

Based on an online optimal decision, an upper bound of a drift decreasing utility function is minimized, which is defined as: $\Delta(Q_i(t)) - V_i E\{U_i[D_i(t)]|Q_i(t)\}$, where $V_i \geq 0$ is a non-negative control parameter. To obtain the upper bound of the drift decreasing utility function, based on control parameters $V_i \geq 0$ and $A_i(t) \in [0, A_i^{max}]$ provided according to any possible decision, the following inequality may be obtained:

$$\Delta(Q_i(t)) - V_i E\{U_i[D_i(t)]|Q_i(t)\}$$

$$\leq B_i + Q_i(t)A_i(t) - E\{Q_i(t)D_i(t)|Q_i(t)\} - V_i E\{U_i[D_i(t)]|Q_i(t)\}$$

where $$B_i = \frac{1}{2}\{(D_i(t)^{max})^2 + (A_i(t)^{max})^2\}.$$

The upper bound of the drift decreasing utility function may be obtained by minimizing the right-hand side (RHS) of the above inequality. Thus, the optimization problem P1-buyer may be transformed to:

$$P2-\text{buyer}: \max_{f_{i,L}(t), D_{i,k}(t)} Y_{b_i}(t) =$$

$$V_i \cdot U_{b_i}[D_i(t)] + \sum_{k \in \{L,M,S\}} Q_i(t) \cdot D_{i,k}(t) - Q_i(t) \cdot A_i(t)$$

$$s.t. T_{i,L}^{Pt}(t) \leq \tau_i^d,$$

$$f_{i,L}^{min} \leq f_{i,L}(t) \leq f_{i,L}^{max}, t \in T,$$

$$0 \leq D_i(t) \leq Q_i(t), t \in T,$$

$$\overline{Q_i(t)} = \lim_{T \to +\infty} \sup \frac{1}{T} \sum_{t=0}^{T-1} E\{Q_i(t)\} \leq +\infty.$$

For each of BSs (base stations)/sellers, based on $e_{i,\hat{k}}[D_i(t)] = \lambda_{\hat{k}} E_{i,\hat{k}}(t), t \in T$, $$s_i[D_i(t)] = \sum_{k \in \{M,S\}} p_{i,k}(t)D_{i,k}(t), i \in M$$

and $$u_k[p_k(t)] = \sum_{\forall i \in M} p_{i,k}(t)D_{i,k}(t), k \in \{M, S\},$$

revenues $\overline{U_{s_k}}, k \in \{M,S\}$ of the MBS/SBS are respectively defined as:

$$P1-\text{seller}(MBS): \max_{p_{i,M}(t), \beta_{i,l_M}(t)} \overline{U_{s_M}} =$$

$$\lim_{T \to +\infty} \frac{1}{T} E\left[\sum_{t=0}^{T-1} \left\{u_M[p_M(t)] - \sum_{\forall i} e_{i,M}[D_{i,M}(t), T_{i,M}^{wt}(t)]\right\}\right]$$

$$s.t. T_{i,M}(t) \geq 0, t \in T,$$

$$p_{i,M}^{co} \leq \tau_i^d, t \in T,$$

$$\beta_{l_M}^{min} \leq \beta_{i,l_M}(t) \leq \beta_{l_M}^{max}, t \in T,$$

$$P1-\text{seller}(SBS): \max_{p_{i,S}(t), \beta_{i,l_S}(t)} \overline{U_{s_S}} =$$

-continued $$\lim_{T \to +\infty} \frac{1}{T} E \sum_{t=0}^{T-1} \left\{ u_S[p_S(t)] - \sum_{\forall i} e_{i,S}\left[D_{i,S}(t), T_{i,S}^{st}(t) T_{i,S}^{wt}(t)\right] \right\}$$

s.t. $p_{i,S}(t) \geq 0, t \in T$, $T_{i,S}^{co} \leq \tau_i^d, t \in T$, $\beta_{l_S}^{min} \leq \beta_{i,l_S}(t) \leq \beta_{l_S}^{max}, t \in T$ The revenues of the MBS and the SBS are related to a pricing set $P_{i,k}(t)$, an allocated computational power $\beta_{i,l_k}(t)$ and a computation waiting delay $T_{i,k}^{wt}(t)$ in the time slot t. In order to ensure that the offloaded tasks are processed within the constrained time period, it is required for the SBS S to consider the waiting time period $T_{i,S}^{st}(t)$ of MD i. Furthermore, based on a maximum theory, the problem P1-seller may be transformed to the following problem:

P2-seller(MBS):

$$\max_{p_M(t), \beta_{i,l_M}} Y_{S_M}(t) = u_M[p_M(t)] - \sum_{\forall i} e_{i,M}\left[D_{i,M}(t), T_{i,M}^{wt}(t)\right]$$

s.t. $p_{i,M}(t) \geq 0, t \in T$, $T_{i,M}^{co} \leq \tau_i^d, t \in T$, $\beta_{l_M}^{min} \leq \beta_{i,l_M}(t) \leq \beta_{l_M}^{max}, t \in T$ P2-seller(SBS):

$$\max_{p_S(t), \beta_{i,l_S}} Y_{S_S}(t) = u_s[p_s(t)] - \sum_{\forall i} e_{i,S}\left[D_{i,S}(t), T_{i,S}^{st}(t), T_{i,S}^{wt}(t)\right]$$

s.t. $p_{i,S}(t) \geq 0, t \in T$, $T_{i,S}^{co} \leq \tau_i^d, t \in T$, $\beta_{l_S}^{min} \leq \beta_{i,l_S}(t) \leq \beta_{l_S}^{max}, t \in T$.

Based on P2-seller, each of the sellers periodically announces a latest market prices $p_k(t)$ based on the user's requirement $D_{i,k}(t)$ and a current network state (such as the calculated waiting time period $T_{i,k}^{wt}(t)$ and the calculated dwell time period $T_{i,s}^{st}(t)$ in the time slot t. With the changes of the requirement and the network state, the seller dynamically adjusts the pricing strategy until market equilibrium is reached, and the allocated computing power $\beta_{i,l_k}(t)$ is adaptively adjusted.

Fourth Embodiment

In the third embodiment, it is assumed in the present disclosure that the dwell time period $T_{i,S}^{st}(t)$ and the waiting delay $T_{i,k}^{wt}(t), \in \{M,S\}$ are known. However, due to the random movements of the users and burst computation requirements, the dwell time period and the waiting delay are uncertain at a beginning of each of time slots. Decisions may be made by using average historical values of the dwell time period and the waiting delay or predicting the dwell time period and the waiting delay. However, in a real time-varying environment, it is difficult to perform high-precision predictions. Imprecise results affect computation performance and offloading success rate. For example, in a case that a predicted dwell time period and a predicted waiting delay are respectively greater than an actual dwell time period and an actual waiting delay, the computation offloading cost increases, or even the offloading process fails. Therefore, a two-stage stochastic programming method is performed according to the present disclosure to perform posteriori remedy to compensate for previous inaccurate predictions.

In order to deal with an uncertain dwell time period $T_{i,S}^{st}(t)$ and an uncertain waiting delay $T_{i,k}^{wt}(t)$, a scenario set having uncertain parameters is considered in the present disclosure. $\Omega_{i,S}^{st}(t)$ represents a scenario set based on possible dwell time periods of the MD i in a SBS, and $\Omega_{i,k}^{wt}(t)$ represents a scenario set based on possible waiting delays of the MD i in a BS k, $k \in \{M,S\}$. Based on a Cartesian product, a composite scenario $\Omega_S^{st}(t)$ based on dwell time periods of all MDs and a composite scenario $\Omega_k^{wt}(t)$ based on waiting delays of all MDs may be respectively expressed as:

$$\Omega_S^{st}(t) = \prod_{i=1}^{m} \Omega_{i,S}^{st}(t) = \Omega_{1,S}^{st}(t) * \ldots * \Omega_{m,S}^{st}(t), \text{ and}$$

$$\Omega_k^{wt}(t) = \prod_{i=1}^{m} \Omega_{i,k}^{st}(t) = \Omega_{1,k}^{wt}(t) * \ldots * \Omega_{m,k}^{wt}(t).$$

It is noted that based on $U_{b_i}[D_i(t)] = u_i[D_i(t)] - c_i[D_i(t), T_{i,S}^{st}(t)] - e_{i,L}[D_i(t), T_{i,S}^{st}(t)] - s_i[D_i(t)]$, a revenue of a MD is related to a scenario $\Omega_{i,s}^{st}(t)$ based on a dwell time period. Therefore, the revenue of the MBS is related to the composite scenario $\Omega_M^{wt}(t)$ and the revenues of the BSs are related to the composite scenario $\Omega_S(t) = \Omega_S^{st}(t) * \Omega_S^{wt}(t)$, where $\Omega_S(t)$ represents a composite scenario based on composite time (that is, dwell time period and waiting delays in the SBSs). Hereafter, a game-based distributed two-stage stochastic programming model is analyzed in the present disclosure.

To simplify the analysis, analysis is performed based on the SBSs in the present disclosure. The analysis based on MBS may be easily derived from the analysis based on the SBSs.

In an uncertain and time-varying network environment, actual values of stochastic variables are obtained after performing processes, that is, the dwell time period $T_{i,S}^{st}(t)$ and the waiting delay $T_{i,k}^{wt}(t)$ are obtained after performing the game and uploading offloaded tasks to the cloud. However, after observing actual situations, compensation may be performed on the game strategy by performing a posterior recourse action. Based on the stochastic programming theory, a decision set includes the following two groups according to the present disclosure.

For a decision group in a first stage (game stage), it is required to adopt a strategy for offloading a task $D_i(t)$ and a strategy for announcing a price $p_{i,S}(t)$ before obtaining $T_{i,S}^{st}(t)$ and $T_{i,S}^{wt}(t)$ through the game. This stage is referred to as a first stage or a game stage.

For a decision group in a second stage (recourse stage), allocation of computing power $\beta_{i,l_S}(t)$ may be performed after observing the realizations of $T_{i,S}^{st}(t)$ and $T_{i,S}^{wt}(t)$, which is referred to as a second stage decision. This stage is referred to as a second stage or a recourse stage.

$T_{i,S}^{st}(t) \in \Omega_{i,S}^{st}(t)$ represents a realization of a dwell time period in a time slot t, and $\omega_S(t) = (T_{1,S}^{st}(t), \ldots, T_{m,S}^{st}(t), \Omega_{1,S}^{qt}, \ldots, \Omega_{m,S}^{qt})$ represents a composite realization of the dwell time period in the time slot t. $p[T_{i,S}^{st}(t)] \in [0,1]$ and $p[\omega_S(t)] \in [0,1]$ represent probabilities. Based on the stochastic programming theory, an optimal problem of P2-buyer may be expressed as a two-stage stochastic programming problem:

P3−buyer(two−stage):

$$\max_{f_{i,L}(t), D_{i,k}(t)} Y_{b_i}(t) = V_i\{u_i[D_i(t)] - s_i[D_i(t)]$$

$$- E_{\Omega^{st}_{i,S}(t)}\{c_i(D_{i,t}(t), T^{st}_{i,S}(t) \mid T^{st}_{i,S}(t) \in \Omega^{st}_{i,S}(t))\}$$

$$- E_{\Omega^{st}_{j=i,S}(t)}\{e_{i,L}(D_{i,t}(t), T^{st}_{i,S}(t) \mid T^{st}_{i,S}(t) \in \Omega^{st}_{i,S}(t))\}\}$$

$$+ \sum_{k \in \{L,M,S\}} Q_i(t) D_{i,k}(t) - Q_i(t) A_i(t)$$

$$s.t. T_{i,L}^{Pt}(t) \leq \tau_i^d,$$

$$f_{i,L}^{min} \leq f_{i,L}(t) \leq f_{i,L}^{max}, t \in T,$$

$$0 \leq D_i(t) \leq Q_i(t), t \in T, \text{ and}$$

$$\overline{Q_i(t)} = \lim_{T \to +\infty} \sup \frac{1}{T} \sum_{t=0}^{T-1} E\{Q_i(t)\} \leq +\infty.$$

Similarly, an optimal problem of P2-seller (SBS) may be expressed as:

P3−seller(two−stage):

$$\max_{p_S(t), \beta_{i,l_S}(t)} Y_{S_S}(t) = u_S[p_S(t)] - E_{\Omega_S(t)}[R(\beta_{i,l_S}(t), \Omega_S(t))]$$

$$s.t. p_{i,S}(t) \geq 0, t \in T,$$

$$T_{i,S}^{co}(t) \leq \tau_i^d, t \in T, \text{ and}$$

$$\beta_{l_S min} \leq \beta_{i,l_S}(t) \leq \beta_{l_S}^{max}, t \in T,$$

where $$R(\beta_{i,l_S}(t), \Omega_S(t)) = \sum_{\forall i} e_{i,S}[D_{i,S}(t), T^{st}_{i,S}(\omega_S(t)), T^{wt}_{i,S}(\omega_S(t))],$$

and $R(\beta_{i,l_S}(t), \Omega_S(t))$ represents a recourse function.

Expressions of an optimal problem for a macro base station may be derived by those skilled in the art based on the expressions for the small base stations, and not repeated in the embodiment.

Fifth Embodiment

As shown in FIG. 1, each of the MDs may move randomly between two or more SBSs. However, it is only required to perform a decision once in each of the time slots by using the game strategy based on two-stage stochastic programming, thus a sub-optimal solution may be obtained. Therefore, statistical features of $T_{i,s}^{st}(t)$ and $T_{i,s}^{wt}(t)$ may be accurately captured, and the offloading strategy, the pricing strategy and the computation power allocation strategy may be accurately defined, and the game strategy may be further developed by using multi-stage stochastic programming. In the multi-stage stochastic programming, a computation offloading process is divided into H sub-slices (H□{$\tau_1$, $\tau_2$, ..., $\tau_H$}). In a sub-slice $\tau_h$, multi-stage stochastic programming is performed, and then the task offloading $D_i(\tau_h)$, $\tau_h \in H$, the price $p_{i,S}(\tau_H)$ and the computation power allocation $\beta_{i,l_S(t)}$ are optimal. $\xi_{i,S}^{st}(\tau_h)$ represents a possible dwell time period in the sub-slice $\tau_h$, and $\xi_S(\tau_h)$ represents possible composite time in the sub-slice $\tau_h$. The dwell time periods in all composite scenarios in all sub-time slots are expressed as:

$$\xi_{i,S}^{st} = \prod_{h=1}^{H} \xi_{i,S}^{st}(\tau_h) = \xi_{i,S}^{st}(\tau_1) \times \ldots \times \xi_{i,S}^{st}(\tau_H),$$

the composite time in all composite scenarios in all sub-time slots is expressed as:

$$\xi_S = \prod_{h=1}^{H} \xi_S(\tau_h) = \xi_S(\tau_1) \times \ldots \times \xi_S(\tau_H).$$

After dividing a task time period t of an offloading task into H sub-time slots, a distributed stochastic programming model having 2 H stages is obtained as follows.

A task offloading optimization problem of a MD/buyer i may be transformed to the following optimization problem of P3-buyer(multi-stage):

P3 − buyer(multi−stage):

$$\max_{f_{i,L}(\tau_h), D_{i,k}(\tau_h)} Y_{b_i}\{D_i(\tau_1), \ldots, D_i(\tau_H), f_{i,L}(\tau_1), \ldots, f_{i,L}(\tau_H)\}$$

$$= V_i\{u_i[D_i(\tau_1)] - c_i[D_i(\tau_1)] - e_{i,L}[D_i(\tau_1)] - s_i[D_i(\tau_1)]$$

$$+ E_{\xi_{i,S}^{st}(\tau_h) \mid \xi_{i,S}^{st}(\tau_{h-1})} \sum_{h=2}^{H} \{u_i[D_i(\tau_h)] - s_i[D_i(\tau_h)]\}$$

$$- E_{\xi_{i,S}^{st}(\tau_h) \mid \xi_{i,S}^{st}(\tau_{h-1})} \sum_{h=2}^{H} c_i[D_i(\tau_h), T^{st}_{i,S}(\tau_h)]$$

$$- E_{\xi_{i,S}^{st}(\tau_h) \mid \xi_{i,S}^{st}(\tau_{h-1})} \sum_{h=2}^{H} e_{i,L}[D_i(\tau_h), T^{st}_{i,S}(\tau_h)]\}$$

$$+ Q_i(\tau_1) D_i(\tau_1) + E_{\xi_{i,S}^{st}(\tau_h) \mid \xi_{i,S}^{st}(\tau_{h-1})} \sum_{h=2}^{H} Q_i(\tau_h) D_i(\tau_h)$$

$$- Q_i(\tau_1) A_i(\tau_1) - E_{\xi_{i,S}^{st}(\tau_h) \mid \xi_{i,S}^{st}(\tau_{h-1})} \sum_{h=2}^{H} Q_i(\tau_h) A_i(\tau_h)$$

$$s.t. f_{i,L}^{min} \leq f_{i,L}(\tau_h) \leq f_{i,L}^{max}, \tau_h \in H,$$

$$\sum_{h=1}^{H} D_i(\tau_h) = D_i(\tau_h), \tau_h \in H, \text{ and}$$

$$0 \leq \sum_{h=1}^{H} D_i(\tau_h) \leq Q_i(\tau_h), \tau_h \in H,$$

where $D_i(\tau_h)$ represents processed tasks of MD i in the sub-time slot $\tau_h$, and $f_{i,L}(\tau_h)$ represents a local computation frequency of MD i in the sub-time slot $\tau_h$.

Similarly, an optimization problem of a SBS/seller is transformed to:

P3 − seller(multi−stage):

$$\max_{p_{i,S}(\tau_h), \beta_{i,S}(\tau_h)} Y_{S_s}\{p_{i,S}(\tau_1), \ldots, p_{i,S}(\tau_H), \beta_{i,S}(\tau_1), \ldots, \beta_{i,S}(\tau_H)\}$$

-continued $$= u_S[p_S(\tau_1)] - \sum_{j=1}^{m}\{e_{i,S}[D_{i,S}(\tau_1)] + p_{i,S}^f[D_{i,S}(\tau_1)]\}$$

$$+ E_{\xi_S(\tau_h)|\xi_S(\tau_{h-1})} \sum_{h=2}^{H} u_S[p_S(\tau_h)]$$

$$- E_{\xi_S(\tau_{h-1})|\xi_S(\tau_{h-1})} \sum_{i=1}^{m}\sum_{h=2}^{H} e_{i,S}[D_{i,S}(\tau_h), T_{i,S}^{st}(\tau_h), T_{i,S}^{wt}(\tau_h)]$$

s.t. $p_{i,S}(\tau_h) \geq 0, \tau_h \in H$, $$E_{\xi_S}\left\{\sum_{h=1}^{H}\left[T_{i,S}^{up}(\tau_h) + T_{i,S}^{wt}(\tau_h) + \sum_{l_k \in L_k}\frac{D_i(\tau_h)\gamma_i}{\beta_{i,l_k}}\right]\right\} \leq \tau_i^d, \text{ and}$$

$$\beta_{l_S}^{min} \leq \beta_{i,l_S}(\tau_h) \leq \beta_{l_S}^{max}, \tau_h \in H,$$

where $$E_{\xi_S}\left\{\sum_{h=1}^{H}\left[T_{i,S}^{up}(\tau_h) + T_{i,S}^{wt}(\tau_h) + \sum_{l_k \in L_k}\frac{D_i(\tau_h)\gamma_i}{\beta_{i,l_k}}\right]\right\} \leq \tau_i^d$$

to ensure that a sum of computation offloading time periods in all sub-slices does not exceed the constraint time length $\tau_i^d$.

Similarly, a multi-stage stochastic model for a macro base station may be established by those skilled in the art based on the idea of establishing the multi-stage stochastic model for the small base station, which is not repeated in the present disclosure.

Sixth Embodiment

In the embodiment, a scenario tree is used to solve the optimization problem of P3-buyer(multi-stage) and the optimization problem of P3-seller(multi-stage), transforming the stochastic programming problem to deterministic equality programming (DEP).

Figure 4:
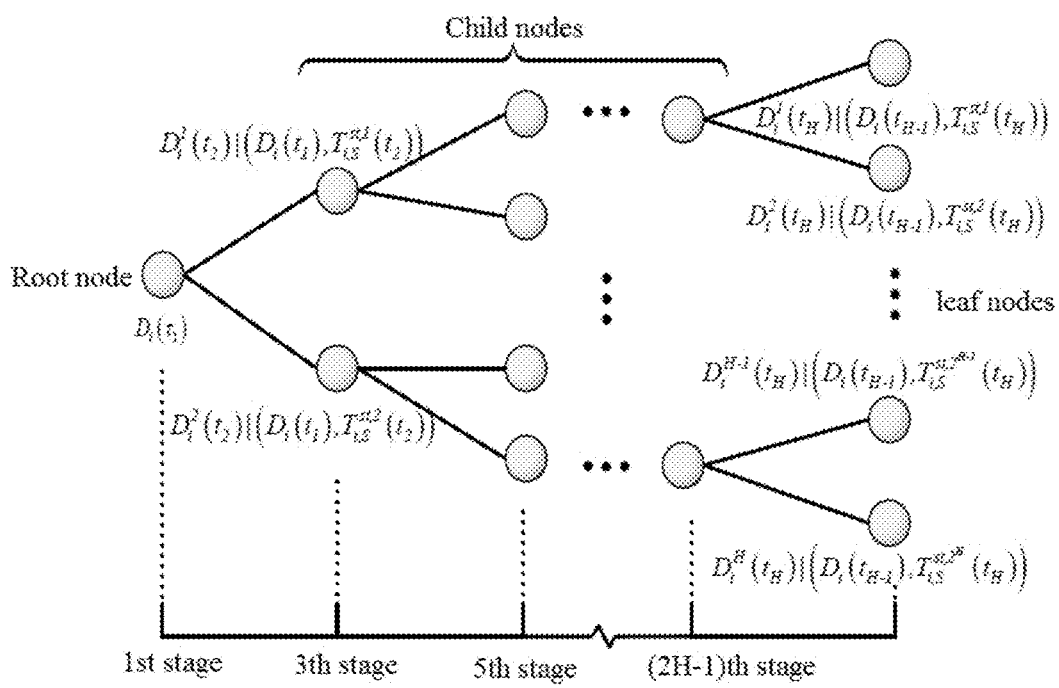
FIG. 4 shows a scenario tree based on dwell time periods of an i-th mobile device according to the present disclosure.

$\pi_{i,S}^{st} \in \xi_{i,S}^{st}$ is defined as an implementation of $\xi_{i,S}^{st}$, and $\pi_S \in \xi_S$ is defined as an implementation of $\tau_S$. The scenario tree is branched according to the implementations of $\tau_{i,S}^{st}(\tau_h)$ and $\xi_S(\tau_h), \tau_h \in H$ FIG. 4 shows a typical scenario tree based on dwell time periods of a MD/Buyer i, in which the evolution of $\xi_{i,S}^{st}(\tau_h) \tau_h \in H$ is described based on two implementations. In the scenario tree based on the dwell time periods, a root node is associated with a first decision stage in which no dwell time period is observed. The root node is connected to child nodes, and the child nodes are associated with a next stage. Each of the nodes is connected to an associated child node in the next stage until to a leaf node. Each of the child nodes has two implementations associated with two random dwell time periods $T_{i,S}^{st}(\tau_h)$: $T_{i,S}^{st,1}(\tau_h), T_{i,S}^{st,2}(\tau_h)$.

After establishing the scenario tree, the stochastic programming problem between the buyer P3-buyer(multi-stage) and the seller P3-seller(multi-stage) is transformed to a DEP problem according to the present disclosure.

$PT_{\pi_{i,S}^{st}}$ represents a path from the root node to a leaf node in the scenario tree based on the dwell time periods. For a determined scenario $\pi_{i,S}^{st} \in \xi_{i,S}^{st}$, $PT_{\pi_{i,S}^{st}}$ is determined. $D_i(\tau_1)$ represents a task offloading decision at the root node, and $D_i(\tau_h)$ represents a offloading decision at a node in a 2 h-th stage in the path $PT_{\pi_{i,S}^{st}}$. The multi-stage stochastic programming of the MD/buyer i may be transformed to the following DEP problem:

$$\max_{f_{i,L}(\tau_h), D_{i,S}(\tau_h)} Y_{b_i}(t) = V_i\{u_i[D_i(\tau_1)] - c_i[D_i(\tau_1)] - e_{i,L}[D_i(\tau_1)] - s_i[D_i(\tau_1)]\}$$

$$+ \sum_{\pi_{i,S}^{st} \in \xi_{i,S}^{st}} p(\pi_{i,S}^{st})\sum_{h=2}^{H}\left\{u_i\left[D_i^{\pi_{i,S}^{st}}(\tau_h)\right] - s_i\left[D_i^{\pi_{i,S}^{st}}(\tau_h)\right]\right\}$$

$$- \sum_{\pi_{i,S}^{st} \in \xi_{i,S}^{st}} p(\pi_{i,S}^{st})\sum_{h=2}^{H}\left\{c_i\left[D_i^{\pi_{i,S}^{st}}(\tau_h)\right], T_{i,S}^{st,\pi_{i,S}^{st}}(\tau_h)\right]\right\}$$

$$- \sum_{\pi_{i,S}^{st} \in \xi_{i,S}^{st}} p(\pi_{i,S}^{st})\sum_{h=2}^{H}\left\{e_{i,L}\left[D_i^{\pi_{i,S}^{st}}(\tau_h), T_{i,S}^{st,\pi_{i,S}^{st}}(\tau_h)\right]\right\}$$

$$+ Q_i(\tau_1)D_i^{\pi_{i,S}^{st}}(\tau_1) - Q_i(\tau_1)A_i(\tau_1)$$

$$+ \sum_{\pi_{i,S}^{st} \in \xi_{i,S}^{st}} p(\pi_{i,S}^{st})\sum_{h=2}^{H}\left\{Q_i(\tau_1)D_i^{\pi_{i,S}^{st}}(\tau_h) - Q_i(\tau_h)A_i(\tau_h)\right\}$$

s.t. $f_{i,L}^{min} \leq f_{i,L}(\tau_h) \leq f_{i,L}^{max}, \tau_h \in H$, $$\sum_{h=1}^{H} D_i(\tau_h) = D_i(\tau_h), \tau_h \in H,$$

$$0 \leq \sum_{h=1}^{H} D_i(\tau_h) \leq Q_i(\tau_h), \tau_h \in H, \text{ and}$$

$$D_{i,k}^{\pi_{i,S}^{st}}(\tau_h) = D_i^{\pi_{i,S}^{st'}}(\tau_h), \forall \pi_{i,S}^{st}, \pi_{i,S}^{st} \in \xi_{i,S}^{st}$$

$$\pi_{i,S}^{st} \neq \pi_{i,S}^{st'}, PT(D_{i,k}^{\pi_{i,S}^{st}}(\tau_h) = PTD_{i,}^{\pi_{i,S}^{st'}}(\tau_h)$$

where $p(\pi_{i,S}^{st})$ represents a probability of a scenario $\pi_{i,S}^{st}$, and the constraint $$D_{i,k}^{\pi_{i,S}^{st}}(\tau_h) = D_i^{\pi_{i,S}^{st'}}(\tau_h), \forall \pi_{i,S}^{st}, \pi_{i,S}^{st} \in \xi_{i,S}^{st}$$

$$\pi_{i,S}^{st} \neq \pi_{i,S}^{st'}, PT(D_{i,k}^{\pi_{i,S}^{st}}(\tau_h) = PTD_{i,}^{\pi_{i,S}^{st'}}(\tau_h)$$

is a unexpected constraint indicating that the offloading decision should be equivalent in different paths.

Similarly, $PT_{\pi_S}$ represents a path from a root node to a leaf node in a composite scenario tree. For a determined scenario $\pi_S \in \xi_S(\tau_h)$, a DEP model of a SBS/seller is expressed as:

$$\max_{p_{i,S}(\tau_h),\beta_{i,S}(\tau_h)} Y_{s_S}(t) = u_s[p_S(\tau_1)] - \sum_{i=1}^{m}\{e_{i,S}[D_{i,S}(\tau_1)] - p_{i,S}^f[D_{i,S}(\tau_h)]\}$$

$$+ \sum_{\pi_S \in \xi_S}^{1} p(\pi_S)\sum_{h=2}^{H} u_S[p_{s^s}^{\pi_s}(\tau_h)]$$

$$- \sum_{i=1}^{m}\sum_{\pi_s \in \xi_s} p(\pi_S)\sum_{h=2}^{H} e_{j,s}[D_{i,s^s}^{\pi}(\tau_h), T_{j,S}^{st,\pi_s}(\tau_h), T_{i,S}^{qt,\pi_s}(\tau_h)]$$

$$\sum_{i=1}^{m}\sum_{\pi_s \in \xi_s} p(s)\sum_{h=2}^{H} p_{i,S}^f[D_{i,S}^{\pi_s}(\tau_h), T_{i,S}^{st,\pi_s}(\tau_h), T_{i,S}^{qt,l r_s}(\tau_h)]$$

s.t. $p_{i,S}(\tau_h) \geq 0, \tau_h \in H$, $$E_{\xi_S}\left\{\sum_{h=1}^{H}\left[T_{i,S}^{up}(\tau_h) + T_{i,S}^{wt}(\tau_h) + \sum_{l_k \in L_k}\frac{D_i(\tau_h)\gamma_i}{\beta_{i,l_k}}\right]\right\} \leq \tau_i^d,$$

$$\beta_{l_S}^{min} \leq \beta_{i,l_S}(\tau_h) \leq \beta_{l_S}^{max}, \tau_h \in H, \text{ and}$$

$$D_{i,S}^{\pi_S}(\tau_h) = D_{i,S}^{\pi_{S'}}(\tau_h), \forall \pi_S, \pi_{S'} \in \xi_S$$

$$\pi_S \neq \pi_{S'}, PT(D_{i,S}^{\pi_S}(\tau_h)) = PT(D_{i,S}^{\pi_{S'}}(\tau_h))$$

where $p(\pi_S)$ represents a probability of a scenario $\pi_S$, and $D_i^{\pi_S}(\tau_h)$ represents a task processed in an h-th stage in a path $PT_{\pi_S}$.

Figure 5:
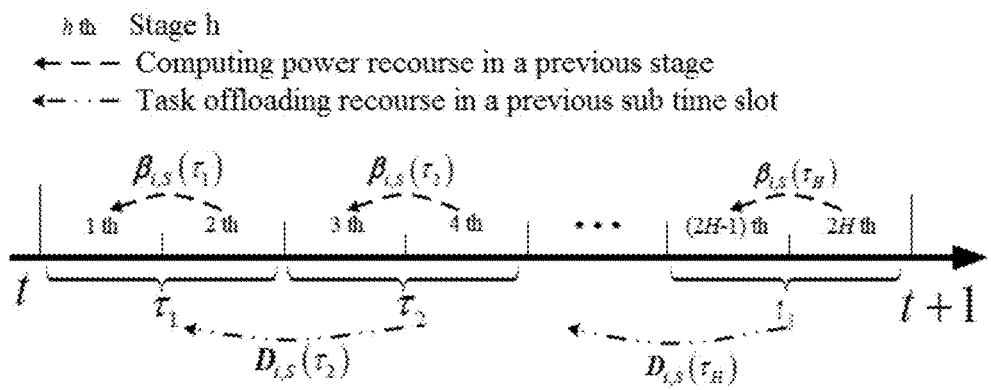
FIG. 5 is a schematic diagram showing a recourse and compensation process according to the present disclosure.

Two stages are included in each of sub-time slots. As shown in FIG. 5, in an even-numbered stage, computation power recourse $\beta_{i,S}(\tau_h)$ is performed on an odd-numbered stage to compensate for the uncertain dwell time period and the uncertain computation waiting delay in the sub-time slot. In a sub-time slot, offloading task recourse $D_{i,S}(\tau_h)$ is performed on a previous sub-time slot to perform accurate compensation and ensure that offloaded tasks may be processed in a constraint time period. In general, the optimal strategy for the multi-stage stochastic programming is related to the number of stages, that is, more divided stages indicate more optimal strategy and more complex solution process.

Seventh Embodiment

In the embodiment, the resource allocation strategy described above in the present disclosure is analyzed. To simplify the analysis, an optimal game strategy in one stage is analyzed in the present disclosure, which may be easily extended to multiple stages in the same way.

1. Analysis of Optimal Game (1) Analysis of the Optimal Strategy for MDs $$\frac{\partial Y_{b_i}(t)}{\partial D_{i,L}(t)} = V_i \left\{ \frac{\rho_i}{(1+D_{i,L}(t))\ln 2} \right\} + Q_i(t)$$

$$\frac{\partial Y_{b_i}(t)}{\partial D_{i,M}(t)} = V_i \left\{ \frac{\rho_i}{(1+D_{i,M}(t))\ln 2} - \theta_i - \frac{\lambda_i P_i(t)}{r_{i,M}(t)} - p_{i,M}(t) \right\} + Q_i(t)$$

$$\frac{\partial Y_{b_i}(t)}{\partial D_{i,S}(t)} = \begin{cases} V_i \left\{ \frac{\rho_i}{(1+D_{i,S}(t))\ln 2} - \theta_i - \frac{\lambda_i P_i(t)}{r_{i,M}(t)} - p_{i,S}(t) \right\} + Q_i(t), & \text{if } T_{i,S}^{st} < \frac{\lambda_i P_i(t)}{r_{i,M}(t)} \\ V_i \left\{ \frac{\rho_i}{(1+D_{i,S}(t))\ln 2} - \eta_i - \frac{\lambda_i P_i(t)}{r_{i,S}(t)} - p_{i,S}(t) \right\} + Q_i(t), & \text{if } T_{i,S}^{st} \geq \frac{\lambda_i P_i(t)}{r_{i,M}(t)} \end{cases}$$

According to P2-buyer, the above first-order partial derivatives $$\frac{\partial Y_{b_i}(t)}{\partial D_{i,L}(t)}, \frac{\partial Y_{b_i}(t)}{\partial D_{i,M}(t)} \text{ and } \frac{\partial Y_{b_i}(t)}{\partial D_{i,S}(t)}$$

may be obtained. In addition, second-order partial derivatives $$\frac{\partial^2 Y_{b_i}(t)}{\partial (D_{i,L}(t))^2} <= 0, \frac{\partial^2 Y_{b_i}(t)}{\partial (D_{i,M}(t))^2} < 0 \text{ and } \frac{\partial^2 Y_{b_i}(t)}{\partial (D_{i,S}(t))^2} < 0$$

may be obtained. Since $$f_{i,L}^{min} \leq f_{i,L}(t) \leq f_{i,L}^{max}, t \in T, \quad 0 \leq D_i(t) \leq Q_i(t),$$

$$t \in T \text{ and } Q_i(t) = \lim_{T \to +\infty} \sup \frac{1}{T} E \sum_{t=0}^{T-1} \{Q_i(t)\} \leq +\infty$$

are affine functions, $Y_{b_i}(t)$ is a convex function for $D_i(t)$. The optimization problem for the buyer/MDs may be solved by Lagrangian multipliers and Karush-Kuhn-Tucker (KKT) conditions, and the optimal strategy is expressed as:

$$f_{i,L}^*(t) = \left( \frac{\rho_i}{A_L \cdot \ln 2} - 1 \right) \frac{\gamma_i}{\tau_i^d}, t \in T$$

$$D_{i,k}^*(t) = \frac{\rho_i}{A_k \cdot \ln 2} - 1, k \in \{M, S\}, t \in T$$

where $$A_L = -\frac{Q_i(t)}{V_i};$$

$$A_M = p_{i,M}(t) + \theta_i + \frac{\lambda_i P_i(t)}{r_{i,M}(t)} - \frac{Q_i(t)}{V_i}; \text{ and}$$

$$A_S = \begin{cases} \theta_i + \frac{\lambda_i P_i(t)}{r_{i,M}(t)} + p_{i,S}(t) - \frac{Q_i(t)}{V_i}, & \text{if } T_{i,S}^{st} < \frac{\lambda_i P_i(t)}{r_{i,M}(t)} \\ \eta_i + \frac{\lambda_i P_i(t)}{r_{i,M}(t)} + p_{i,S}(t) - \frac{Q_i(t)}{V_i}, & \text{if } T_{i,S}^{st} \geq \frac{\lambda_i P_i(t)}{r_{i,M}(t)} \end{cases}.$$

(2) Analysis of the Optimal Strategy for BSs

According to P2-seller (SBS), the first-order partial derivative of $Y_{s_k}(t)$ to $p_{i,k}(t)$ may be obtained as follows:

$$\frac{\partial Y_{s_k}(t)}{\partial p_{i,k}(t)} = D_{i,k}(t) + p_{i,k}(t) \frac{\partial D_{i,k}(t)}{\partial p_{i,k}(t)} - \frac{2\lambda_k k_k D_{i,k}(t) \gamma_i^2}{T_{i,k}^{pt}} \frac{\partial D_{i,k}(t)}{\partial p_{i,k}(t)} - \delta_{i,k}^f \frac{\partial D_{i,k}(t)}{\partial p_{i,k}(t)} \cdot 1\{T_{i,k}^{co}(t) \geq \tau_i^d\}$$

In a case that a trading price in the market meets $P_{i,k}(t) \geq 0$, it is determined that $$\frac{\partial^2 Y_{s_k}(t)}{\partial (p_{i,k}(t))^2} < 0, k \in \{M, S\}.$$

In addition, since $p_{i,M}(t) \geq 0$, $t \in T$, $T_{i,M}^{co}(t) \leq \tau_i^d$, $t \in T$, $\beta_{I_M}^{min} \leq \beta_{i,I_M}(t)$, $t \in T$, $p_{i,S}(t) \geq 0$, $t \in T$, $T_{i,S}^{co}(t) \leq \tau_i^d$, $t \in T$, and $\beta_{I_S}^{min} \leq \beta_{i,I_S}(t) \leq \beta_{I_S}^{max}$, $t \in T$ are affine functions and $Y_{s_k}(t)$ is a convex function for $p_{i,k}(t)$, the optimal problem for the BSs/sellers may be solved based on Lagrangian multipliers and KKT, and the optimal strategy is expressed as:

$$p_{i,k}^*(t) = 2\lambda_k k_k \frac{D_{i,k}^*(t) \gamma_i^2}{T_{i,k}^{pt}} - \frac{D_{i,k}^*(t)}{\Theta_k}$$

where $$\Theta_k = \frac{\partial D^*_{i,k}(t)}{\partial p_{i,k}(t)}, k \in \{M, S\}.$$

Definition 1: in a case that a price $p_{i,k}(t)$ of a seller k is determined, $D_{i,k}^{SE}(t)$ meets $$Y_{b_i}(D_{i,k}^{SE}(t)) = \sup_{D_{i,k}^{min}(t) \leq D_{i,k}(t) \leq D_{i,k}^{max}(t)} \{Y_{b_i}(D_{i,k}(t))\}, \forall t \in T;$$

and in a case that an offloading task $D_{i,k}(t)$ of a buyer i is determined, $p_{i,k}^{SE}(t)$ meets $$Y_{s_k}\left(p_{i,k}^{SE}(t) = \sup_{p_{i,k}(t) \geq 0} \{Y_{s_k}(p_{i,k}(t))\}, \forall t \in T.\right.$$

Hereinafter, it is proved that the optimal solution $(D^*_{i,k}(t), p^*_{i,k}(t))$ is $(D_{i,k}^{SE}(t), p_{i,k}^{SE}(t))$ based on the following three lemmas according to the present disclosure.

Lemma 1: in a case that a price $p_{i,k}(t)$ of a BS/seller k is determined, a revenue function $Y_{b_i}(D_{i,k}(t))$ of a MD/buyer reaches a maximum value at $D^*_{i,k}(t)$.

Proof: based on the above analysis, it is known that $Y_{b_i}$ is a convex function for $D_{i,k}(t)$. Therefore, the revenue function $Y_{b_i}(D_{i,k}(t))$ reaches a maximum value at $D^*_{i,k}(t)$. According to Definition 1, $D^*_{i,k}(t)$ is an SE solution $D_{i,k}^{SE}(t)$.

Lemma 2: for a buyer, an optimal offloading task $D^*_{i,k}(t)$ decreases as a price $p_{i,k}(t)$ of a seller increases.

Proof: based on $$f^*_{i,L}(t) = \left(\frac{\rho_i}{A_L \cdot \ln 2} - 1\right)\frac{\gamma_i}{\tau_i^d}, t \in T,$$

it may be obtained that:

$$\frac{\partial D^*_{i,k}(t)}{\partial p_{i,k}(t)} = -\frac{\rho_i}{A_k^2}\ln 2 < 0.$$

Therefore, it can be obtained that $D^*_{i,k}(t)$ is a monotonically decreasing function for $p_{i,k}(t)$. That is, a higher transaction price indicates fewer tasks to be offloaded by the buyer, thus little revenue or no revenue may be obtained by the seller. Therefore, the seller should provide an appropriate price to maximize the revenue. The optimal price of the seller may be obtained by solving $$\frac{\partial Y_{s_k}(p_{i,k}(t))}{\partial p_{i,k}(t)} = 0.$$

Lemma 3: in a case that an optimal offloading task $D^*_{i,k}(t)$ of a MD/buyer i is constant, $Y_{s_k}(p_{i,k}(t))$ reaches a maximum value at $p^*_{i,k}(t)$.

Proof: it has been proved in the present disclosure that the revenue $Y_{s_k}$ of the seller is a convex function for $P_{i,k}(t)$. Therefore, according to Definition 1, $Y_{s_k}(p_{i,k}(t))$ reaches a maximum value at $p^*_{i,k}(t)$, and $p^*_{i,k}(t)$ is an SE solution $p_{i,k}^{SE}(t)$.

In short, $(D^*_{i,k}(t), p^*_{i,k}(t))$ is the optimal task offloading and pricing decision, and is the SE solution $(D_{i,k}^{SE}(t), p_{i,k}^{SE}(t))$.

Figure 6:
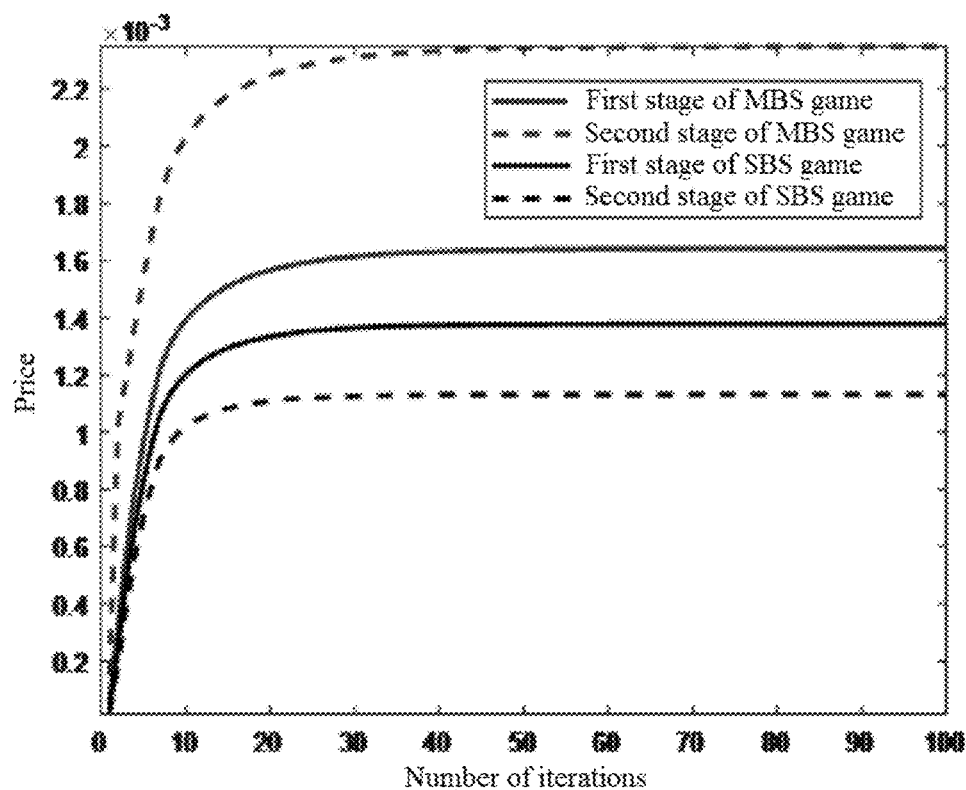
FIG. 6 is a schematic diagram showing changes of a price with the number of iterations according to the present disclosure.
Figure 7:
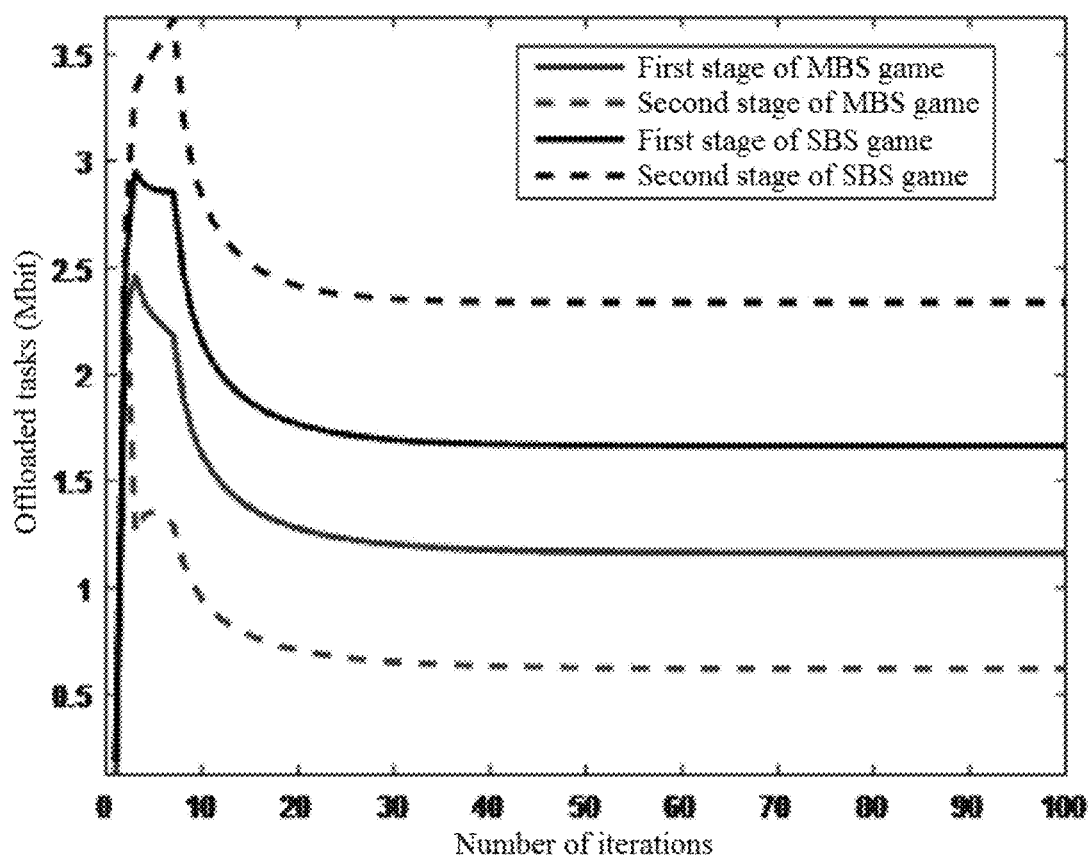
FIG. 7 is a schematic diagram showing changes of offloaded tasks with the number of iterations according to the present disclosure.
Figure 8:
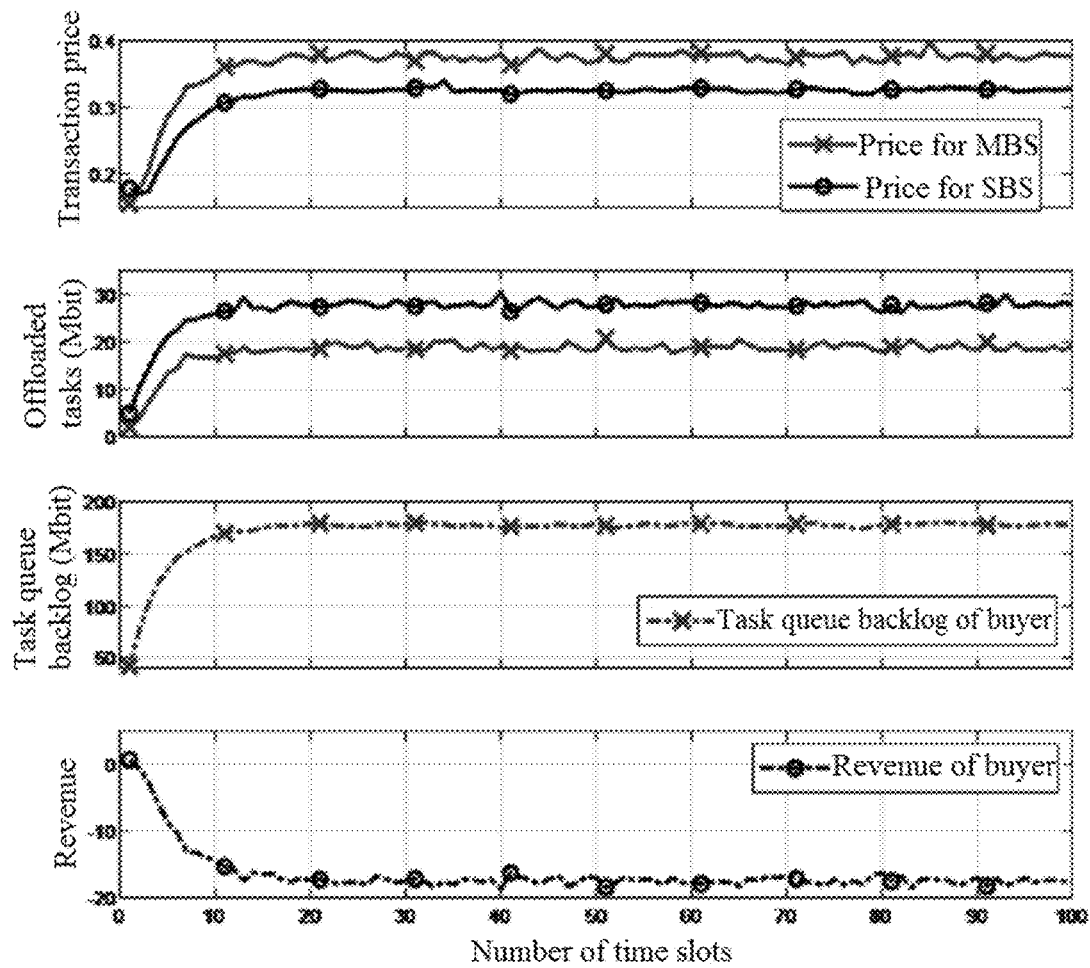
FIG. 8 is a schematic diagram showing changes of a calculation offloading performance with time (in which V is equal to 500 and represents a non-negative control parameter in a drift decreasing utility function) according to the present disclosure.
Figure 9:
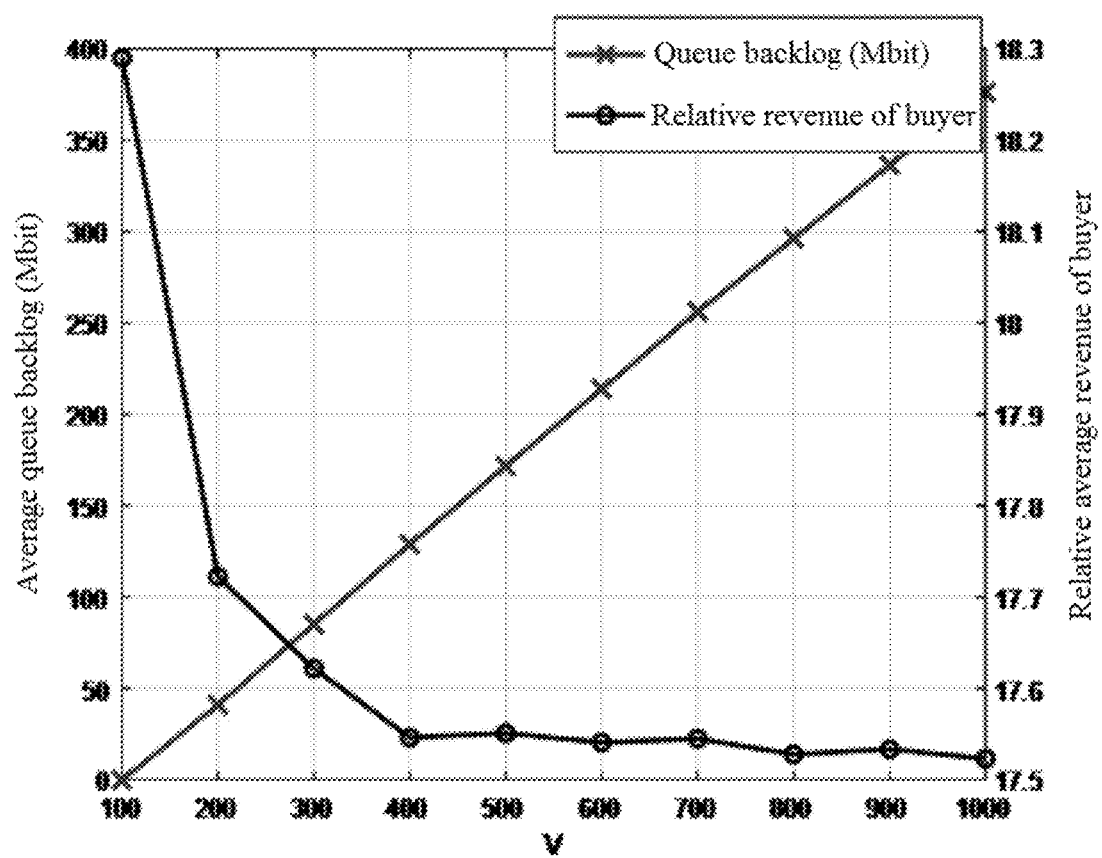
FIG. 9 is a schematic diagram showing changes of a computation offloading performance with V according to the present disclosure.

It can be seen from FIGS. 6 to 7 that price is not to be reduced with the iterations, and the price gradually be converged to an optimal pricing strategy as the number of iterations increases. In FIG. 6, referring to a point at which the number of iterations is 50, four curves from top to bottom respectively represent a second stage of a MBS game, a first stage of the MBS game, a first stage of a SBS game, and a second stage of the SBS game. In FIG. 7, referring to a point at which the number of iterations is 50, four curves from top to bottom respectively represent a second stage of a SBS game, a first stage of the SBS game, a first stage of a MBS game and a second stage of the MBS game. In addition, the number of unloaded tasks decreases with the increase of price. When the price is no longer increased, the unloading strategy is stable, verifying the effectiveness of the method. It can be seen from FIGS. 8 to 9 that the transaction price in the market gradually increases with the backlog of the task queue of the buyers, and the revenues of the buyers gradually decreases with the increase of the offloading cost. It can be seen from FIG. 9 that there is a trade-off [O(1/V), O(V)] between an average queue backlog and the revenue, verifying the rationality of the method.

In the embodiments according to the present disclosure, a subscript S represents a parameter associated with a small base station, a subscript M represents a parameter associated with a macro base station, and a subscript i represents a parameter associated with a mobile device.

Although the embodiments of the present disclosure have been shown and described, it should be understood by those skilled in the art that a variety of variations, modifications, replacements and variants can be made based on these embodiments without departing from the principles and spirit of the present disclosure, and the scope of the present disclosure is limited by the appended claims and their equivalents.

The invention claimed is:

1. A distributed computation offloading method based on computation-network collaboration in a stochastic network, comprising:
    establishing a local computing model and an edge-cloud computing model based on differentiated service quality requirements, task processing costs, and the type of a device in a ultra-dense network UDN environment;
    establishing, based on the local computing model and the edge-cloud computing model, a device revenue maximization problem model by using a Lyapunov optimization theory and a minimum drift decreasing utility function at the device;
    establishing, based on the local computing model and the edge cloud computing model, a MEC server revenue maximization problem model by using a maximum value theory at a multi-access edge computing MEC server,
    respectively establishing, based on a random movement of a user and a burst computation requirement, a composite scenario set based on a dwell time period and a composite scenario set based on a waiting delay;
    performing compensation on a game strategy by performing a posteriori recourse action, and establishing a game-based stochastic programming model for the device and the MEC server,
    establishing a scenario tree to transform a multi-stage stochastic programming problem of the device and the MEC server to a DEP problem;
    solving an optimization problem of the device and an optimization problem of the MEC server based on a Lagrangian multiplier and a KKT condition to obtain an optimal task offloading strategy of the device to the MEC server and an optimal quotation strategy of the MEC server to the device; and in a case that both the optimal task offloading strategy of the device to the MEC server and the optimal quotation strategy of the MEC server to the device meet a Stackelberg equilibrium solution, offloading, by the device based on the optimal task offloading strategy, a task to the MEC server.

2. The distributed computation offloading method according to claim 1, wherein the establishing a device revenue maximization problem model comprises:

$$\max_{f_{i,L}(t), D_{i,k}(t)} Y_{b_i}(t) = V_i \cdot U_{b_i}[D_i(t)] + \sum_{k \in \{L,M,S\}} Q_i(t) \cdot D_{i,k}(t) - Q_i(t) \cdot A_i(t),$$

and constraints comprise:

$T_{i,L}^{pt}(t) \leq \tau_i^d$, $f_{i,L}^{min} \leq f_{i,L}(t) \leq f_{i,L}^{max}, t \in T$ $0 \leq D_i(t) \leq Q_i(t), t \in T$, and $$\overline{Q_i(t)} = \lim_{T \to +\infty} \sup \frac{1}{T} \sum_{t=0}^{T-1} E\{Q_i(t)\} \leq +\infty;$$

where $f_{i,L}$ (t) represents a CPU clock frequency set of an i-th device, $D_{i,k}(t)$ represents an offloading task set in a time slot t, $Y_{b_i}(t)$ represents a long-term revenue of the i-th device, $V_i$ represents a non-negative control parameter in the Lyapunov optimization theory, $D_{i,k}$ (t) represents an offloading task for an i-th mobile device, $A_i(t)$ represents a task arriving at the i-th mobile device in the time slot t, T represents a time slot index and T={0, 1, . . . }, $U_{b_i}[D_i(t)]$ represents a total revenue of the i-th device in the time slot t; k∈ {L, M, S} represents a current task type, L represents a non-offloading task, M represents a task offloaded to a macro base station, S represents a task offloaded to a small base station; $T_{i,L}^{pt}(t)$ represents a time period in which a local server processes an offloaded task, $T_i^d$ represents a maximum computation delay constraint of $D_i(t)$, $f_{i,L}^{min}$ represents a minimum CPU clock frequency allocated for the i-th mobile device in the time slot t, $f_{i,L}(t)$ represents a CPU clock frequency allocated for the i-th mobile device in the time slot t, $f_{i,L}^{max}$ represents a maximum CPU clock frequency allocated for the i-th mobile device in the time slot t, $D_i(t)$ represents a task processing decision at a beginning of the time slot t, $Q_i(t)$ represents a task queue backlog at the beginning of the time slot t, and $\overline{Q_i(t)}$ represents an average queue backlog.

3. The distributed computation offloading method according to claim 1, wherein in a case that a task is offloaded to a macro base station, the MEC server revenue maximization problem model is expressed as:

$$\max_{p_M(t), \beta_{i,l_M}} Y_{s_M}(t) = u_M[p_M(t)] - \sum_{\forall i} e_{i,M}\left[D_{i,M}(t), T_{i,M}^{wt}(t)\right],$$

and constraints comprise:

$p_{i,M}(t) \geq 0, t \in T$, $T_{i,M}^{co}(t) \leq \tau_i^d, t \in T$, and $\beta_{l_M}^{min} \leq \beta_{i,l_M}(t) \leq \beta_{l_M}^{max}, t \in T$;

where $P_M(t)$ represents a pricing set of the macro base station in a time slot t, $\beta_{i,l_M}$ represents a computing capacity set allocated to the macro base station, $Y_{s_M}(t)$ represents a revenue of the macro base station, $u_M[p_M(t)]$ represents a service utility of the macro base station, $e_{i,M}[D_{i,M}(t), T_{i,M}^{wt}(t)]$ represents a task computing energy consumption of the macro base station, $P_{i,M}(t)$ represents a payment cost of an i-th device in the time slot t to the macro base station, T represents a time slot index and T={0, 1, . . . }, $T_{i,M}^{co}(t)$ represents a total computation offloading time period of the macro base station in the time slot t, $\tau_i^d$ represents a maximum computation delay constraint of $D_i(t)$, $\beta_{l_M}^{min}$ represents a minimum frequency of each of CPU cores in the macro base station, $\beta_{i,l_M}(t)$ represents a frequency of an i-th CPU core in the macro base station, and $\beta_{l_M}^{max}$ represents a maximum frequency of each of the CPU cores in the macro base station.

4. The distributed computation offloading method according to claim 1, wherein in a case that a task is offloaded to a small base station, the MEC server revenue maximization problem model is expressed as:

$$\max_{p_S(t), \beta_{i,l_S}} Y_{s_S}(t) = u_S[p_S(t)] - \sum_{\forall i} e_{i,S}\left[D_{i,S}(t), T_{i,S}^{st}(t), T_{i,S}^{wt}(t)\right]$$

and constraints comprise:

$p_{i,S}(t) \geq 0, t \in T$, $T_{i,S}^{co}(t) \leq \tau_i^d, t \in T$, and $\beta_{l_S}^{min} \leq \beta_{i,l_S}(t) \leq \beta_{l_S}^{max}, t \in T$;

where $p_S(t)$ represents a pricing set of the small base station in a time slot t, $\beta_{i,l_S}$ represents a computing capacity set allocated to the small base station, $Y_{s_S}(t)$ represents a revenue of the small base station, $u_S[p_S(t)]$ represents a service utility of the small base station, $e_{i,S}[D_{i,S}(t), T_{i,S}^{st}(t), T_{i,S}^{wt}(t)]$ represents a task computing energy consumption of the small base station, $p_{i,S}(t)$ represents a payment cost of an i-th device in the time slot t to the small base station, T represents a time slot index and T={0, 1, . . . }, $T_{i,S}^{co}(t)$ represents a total computation offloading time period of the small base station in the time slot t, $\tau_i^d$ represents a maximum computation delay constraint of $D_i(t)$, $\beta_{l_S}^{min}$ represents a minimum frequency of each of CPU cores in the small base station, $\beta_{i,l_S}(t)$ represents a frequency of an i-th CPU core in the small base station, and $\beta_{l_S}^{max}$ represents a maximum frequency of each of the CPU cores in the small base station.

5. The distributed computation offloading method according to claim 1, wherein the establishing a composite scenario set based on a dwell time period and a composite scenario set based on a waiting delay comprises:

in a case that a possible dwell time period and a possible waiting time period of a mobile device in a small base station are known, obtaining, based on a Cartesian product, a composite scenario based on dwell time periods of all mobile devices and a composite scenario based on waiting delays of all the mobile devices, wherein a composite scenario set based on the dwell time periods of all the mobile devices is expressed as:

$$\Omega_S(t) = \Omega_S^{st}(t) * \Omega_S^{wt}(t),$$

$$\Omega_S^{st}(t) = \prod_{i=1}^{m} \Omega_{i,S}^{st}(t) = \Omega_{1,S}^{st}(t) * \ldots * \Omega_{m,S}^{st}(t), \text{ and}$$

$$\Omega_k^{wt}(t) = \prod_{i=1}^{m} \Omega_{i,k}^{wt}(t) = \Omega_{1,k}^{wt}(t) * \ldots * \Omega_{m,k}^{wt}(t);$$

where m represents the number of the mobile devices, $\Omega_{i,S}^{st}(t)$ represent a composite scenario based on a dwell time period of an i-th mobile device, and $\Omega_{i,k}^{wt}(t)$ represents a composite scenario based on a waiting delay of the i-th mobile device.

6. The distributed computation offloading method according to claim 1, wherein compensation is performed on the game strategy by using the posteriori recourse action, that is, a two-stage optimal programming model is adopted, parameters are obtained based on the device revenue maximization problem model and the MEC server revenue maximization problem model in a first stage, compensation is performed on the parameters obtained in the first stage by using the posteriori recourse action in a second stage, and the device revenue maximization problem model after the compensation performed by using the posterior recourse action is expressed as:

$$\max_{f_{i,L}(t),D_{i,k}(t)} Y_{b_i}(t) =$$

$$V_i \Big\{ u_i[D_i(t)] - s_i[D_i(t)] - E_{\Omega_{i,S}^{st}(t)} \{ c_i(D_{i,t}(t), T_{i,S}^{st}(t) | T_{i,S}^{st}(t) \in \Omega_{i,S}^{st}(t)) \} - E_{\Omega_{i,S}^{st}(t)}$$

$$\{ e_{i,L}(D_{i,t}(t), T_{i,S}^{st}(t) | T_{i,S}^{st}(t) \in \Omega_{i,S}^{st}(t)) \} \Big\} + \sum_{k \in \{L,M,S\}} Q_i(t) D_{i,k}(t) - Q_i(t) A_i(t) i$$

and constraints comprise:

$$T_{i,L}^{pt}(t) \leq \tau_i^d,$$

$$f_{i,L}^{min} \leq f_{i,L}(t) \leq f_{i,L}^{max}, t \in T,$$

$$0 \leq D_i(t) \leq Q_i(t), t \in T, \text{ and}$$

$$\overline{Q_i(t)} = \lim_{T \to +\infty} \sup \frac{1}{T} \sum_{t=0}^{T-1} E\{Q_i(t)\} \leq +\infty;$$

in a case that a task is offloaded to a small base station, the MEC server revenue maximization problem model after the compensation performed by using the posterior recourse action is expressed as:

$$\max_{p_S(t),\beta_{i,l_S}(t)} Y_{s_S}(t) = u_S[p_S(t)] - E_{\Omega_S(t)}[R(\beta_{i,l_S}(t), \Omega_S(t))],$$

and constraints comprise:

$$p_{i,S}(t) \geq 0, t \in T,$$

$$T_{i,S}^{co}(t) \leq \tau_i^d, t \in T, \text{ and}$$

$$\beta_{l_S}^{min} \leq \beta_{i,l_S}(t) \leq \beta_{l_S}^{max}, t \in T;$$

where $f_{i,L}(t)$ represents a CPU clock frequency set of an i-th device, $D_{i,k}(t)$ represents an offloading task set, $Y_{b_i}(t)$ represents a long-term revenue of the i-th device, $V_i$ represents a non-negative control parameter in the Lyapunov optimization theory, $u_i[D_i(t)]$ represents a utility of the i-th device, $S_i[D_i(t)]$ represents a computation service cost of the i-th device, $E_{\Omega_{i,S}^{st}(t)}\{(c_i(D_{i,t}(t), T_{i,S}^{st}(t)|T_{i,S}^{st}(t) \in \Omega_{i,S}^{st}(t))\}$ represents an average communication cost in a composite scenario $\Omega_{i,S}^{st}(t)$, $E_{\Omega_{i,S}^{st}(t)}\{e_{i,L}(D_{i,t}(t), T_{i,S}^{st}(t)|T_{i,S}^{st}(t) \in \Omega_{i,S}^{st}(t))\}$ represents an average energy consumption cost in the composite scenario $\Omega_{i,S}^{st}(t)$, $D_{i,k}(t)$ represents an offloading task for the i-th mobile device, $A_i(t)$ represents a task arriving at the i-th mobile device in a time slot t, T represents a time slot index and T={0, 1, . . . }, $U_{b_i}[D_i(t)]$ represents a total revenue of the i-th device in the time slot t, $k \in \{L, M, S\}$ represents a current task offloading position, L indicates that a task is offloaded locally, M indicates that a task is offloaded to a macro base station, S indicates that a task is offloaded to a small base station, $T_{i,L}^{pt}(t)$ represents a time period in which a local server processes an offloaded task, $\tau_i^d$ represents a maximum computation delay constraint of $D_i(t)$, $f_{i,L}^{min}$ represents a minimum CPU clock frequency allocated for the i-th mobile device in the time slot t, $f_{i,L}(t)$ represents a CPU clock frequency allocated for the i-th mobile device in the time slot t, $f_{i,L}^{max}$ represents a maximum CPU clock frequency allocated for the i-th mobile device in the time slot t, $D_i(t)$ represents a task processing decision at a beginning of the time slot t, $Q_i(t)$ represents a task queue backlog at the beginning of the time slot t, $\overline{Q_i(t)}$ represents an average queue backlog, $Y_{s_S}(t)$ represents a revenue of a small base station, $u_S[p_S(t)]$ represents a service utility of the small base station, $E_{\Omega_S(t)}[R(\beta_{i,l_S}(t), \Omega_S(t))]$ represents an average recourse in a composite scenario $\Omega_{i,S}^{st}(t)$, $P_{i,M}(t)$ represents a payment cost of the i-th device to the macro base station in the time slot t, T represents a time slot index and T={0, 1, . . . }, $T_{i,M}^{co}(t)$ represents a total computation offloading time period of the macro base station in the time slot t, $\tau_i^d$ represents a maximum computation delay constraint of $D_i(t)$, $\beta_{l_M}^{min}$ represents a minimum frequency of each of CPU cores in the macro base station, $\beta_{i,l_M}(t)$ represents a frequency of an i-th CPU core in the macro base station, and $\beta_{l_M}^{max}$ represents a maximum frequency of each of the CPU cores in the macro base station.

7. The distributed computation offloading method according to claim 6, wherein a recourse function $R(\beta_{i,l_S}(t), \Omega_S(t))$ is expressed as:

$$R(\beta_{i,l_S}(t), \Omega_S(t)) = \sum_{\forall i} e_{i,S}[D_{i,S}(t), T_{i,S}^{st}(\omega_S(t)), T_{i,S}^{wt}(\omega_S(t))]$$

where $e_{i,S}[D_{i,S}(t), T_{i,S}^{st}(\Omega_S(t)), T_{i,S}^{wt}(\omega_S(t))]$ represents an energy consumption cost of the small base station.

8. The distributed computation offloading method according to claim 6, wherein a task offloading process is divided into H sub-time slots, a distributed programming model with 2H stages is obtained, and the device revenue maximization problem model is expressed as:

$$\max_{f_{i,L}(\tau_h), D_{i,k}(\tau_h)} Y_{b_i}\{D_i(\tau_1), \ldots, D_i(\tau_H), f_{i,L}(\tau_1), \ldots, f_{i,L}(\tau_H)\} =$$

$$V_i \left\{ u_i[D_i(\tau_1)] - c_i[D_i(\tau_1)] - e_{i,L}[D_i(\tau_1)] - s_i[D_i(\tau_1)] + \right.$$

$$E_{\xi_{i,S}^{st}(\tau_h) | \xi_{i,S}^{st}(\tau_{h-1})} \sum_{h=2}^{H} \{u_i[D_i(\tau_h)] - s_i[D_i(\tau_h)]\} - E_{\xi_{i,S}^{st}(\tau_h) | \xi_{i,S}^{st}(\tau_{h-1})}$$

$$\sum_{h=2}^{H} c_i[D_i(\tau_h), T_{i,S}^{st}(\tau_h)] - E_{\xi_{i,S}^{st}(\tau_h) | \xi_{i,S}^{st}(\tau_{h-1})} \sum_{h=2}^{H} e_{i,L}[D_i(\tau_h), T_{i,S}^{st}(\tau_h)] \right\} +$$

$$Q_i(\tau_1)D_i(\tau_1) + E_{\xi_{i,S}^{st}(\tau_h) | \xi_{i,S}^{st}(\tau_{h-1})} \sum_{h=2}^{H} Q_i(\tau_h)D_i(\tau_h) - Q_i(\tau_1)A_i(\tau_1) -$$

$$E_{\xi_{i,S}^{st}(\tau_h) | \xi_{i,S}^{st}(\tau_{h-1})} \sum_{h=2}^{H} Q_i(\tau_h)A_i(\tau_h)$$

and constraints comprise:

$$f_{i,L}^{min} \leq f_{i,L}(\tau_h) \leq f_{i,L}^{max}, \tau_h \in H,$$

$$\sum_{h=1}^{H} D_i(\tau_h) = D_i(\tau_h), \tau_h \in H, \text{ and}$$

$$0 \leq \sum_{h=1}^{H} D_i(\tau_h) \leq Q_i(\tau_h), \tau_h \in H;$$

in the case that the task is offloaded to the small base station, the MEC server revenue maximization problem model is expressed as:

$$\max_{p_{i,S}(\tau_h), \beta_{i,S}(\tau_h)} Y_{s_S}\{p_{i,S}(\tau_1), \ldots, p_{i,S}(\tau_H), \beta_{i,S}(\tau_1), \ldots, \beta_{i,S}(\tau_H)\} =$$

$$u_S[p_S(\tau_1)] - \sum_{i=1}^{m} \{e_{i,S}[D_{i,S}(\tau_1)] + p_{i,S}^f[D_{i,S}(\tau_1)]\} + E_{\xi_S(\tau_h) | \xi_S(\tau_{h-1})}$$

$$\sum_{h=2}^{H} u_S[p_S(\tau_h)] - E_{\xi_S(\tau_h) | \xi_S(\tau_{h-1})} \sum_{i=1}^{m} \sum_{h=2}^{H} e_{i,S}[D_{i,S}(\tau_h), T_{i,S}^{st}(\tau_h), T_{i,S}^{wt}(\tau_h)]$$

and constraints comprise:

$$p_{i,S}(\tau_h) \geq 0, \tau_h \in H,$$

$$E_{\xi_S} \left\{ \sum_{h=1}^{H} [T_{i,S}^{up}(\tau_h) + T_{i,S}^{wt}(\tau_h) + \sum_{l_k \in L_k} \frac{D_i(\tau_h)\gamma_i}{\beta_{i,l_k}}] \right\} \leq \tau_i^d, \text{ and}$$

$$\beta_{l_S}^{min} \leq \beta_{i,l_S}(\tau_h) \leq \beta_{l_S}^{max}, \tau_h \in H;$$

where $f_{i,L}(\tau_h)$ represents a CPU clock frequency set of an i-th device in a sub-time slot $\tau_h$, $D_{i,k}(\tau_h)$ represents a offloading task set of an i-th mobile device in the sub-time slot $\tau_h$, $u_i[D_i(\tau_l)]$ represents a utility of the i-th mobile device in a root node, $c_i[D_i(T_1)]$ represents a communication cost of the i-th mobile device in the root node, $e_{i,L}[D_i(\tau_1)]$ represents an energy consumption cost of the i-th mobile device in the root node, $S_i[D_i(\tau_1)]$ represents a computation service cost of the i-th mobile device in the root node, $T_{i,S}^{st}(\tau_h)$ represents a dwell time period of the i-th mobile device in the small base station in the sub-time slot $\tau_h$, $D_i(\tau_h)$ represents a processed task of the i-th mobile device in the sub-time slot $\tau_h$, $f_{i,L}(\tau_h)$ represent a local computation frequency of the i-th mobile device in the sub-time slot $\tau_h$; $Q_i(\tau_h)$ represents a task queue backlog in the sub-time slot $\tau_h$, $\xi_{i,S}^{st}(\tau_h)$ represents a dwell time period in the sub-time slot $\tau_h$, and $A_i(\tau_1)$ represents a task arriving at the i-th mobile device in the root node.

9. The distributed computation offloading method according to claim 1, wherein
the optimal strategy of the device is obtained based on the Lagrangian multiplier and the KKT condition by using the following equations:

$$f_{i,L}^*(t) = \left(\frac{\rho_i}{A_L \cdot \ln 2} - 1\right)\frac{\gamma_i}{\tau_i^d}, t \in T, \text{ and}$$

$$D_{i,k}^*(t) = \frac{\rho_i}{A_k \cdot \ln 2} - 1, k \in \{M, S\}, t \in \tau; \text{ and}$$

the optimal quotation strategy of the MEC server to the device is obtained based on the Lagrangian multiplier and the KKT condition by using the following equation:

$$p_{i,k}^*(t) = 2\lambda_k k_{l_k} \frac{D_{i,k}^*(t)\gamma_i^2}{T_{i,k}^{pt}} - \frac{D_{i,k}^*(t)}{\Theta_k};$$

where, $f^*_{i,L}(t)$ represents an optimal local computation frequency, $\rho_i$ represents a utility weight parameter of an i-th mobile user, $A_L$ represents a locally arriving task set, $\gamma_i$ represents a computation density in cycles/bit obtained by performing an offline measurement, $\tau_i^d$ represents a maximum computation delay constraint of $D_i(t)$, $D^*_{i,k}(t)$ represents an optimal offloading strategy, $p^*_{i,k}(t)$ represents an optimal quotation strategy of a base station, $\lambda_k$ represents a unit energy consumption, $k_{l_k}$ represents an effective switching capacitance in the MEC server, $D^*_{i,k}(t)$ represents an optimal offloading strategy, $T_{i,k}^{pt}$ represents a processing time period for offloading a task, and $$\Theta_k = \frac{\partial D_{i,k}^*(t)}{\partial p_{i,k}(t)}, k \in \{M, S\}$$

represents a first-order derivative of the optimal offloading strategy to a quotation.

* * * * *